(12) United States Patent
Kawamura et al.

(10) Patent No.: US 7,536,444 B2
(45) Date of Patent: May 19, 2009

(54) REMOTE COPYING SYSTEM AND REMOTE COPYING METHOD

(75) Inventors: Shunji Kawamura, Yokohama (JP); Kenta Ninose, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 674 days.

(21) Appl. No.: 10/991,425

(22) Filed: Nov. 19, 2004

(65) Prior Publication Data
US 2006/0069865 A1    Mar. 30, 2006

(30) Foreign Application Priority Data
Sep. 30, 2004    (JP)    ............................. 2004-285664

(51) Int. Cl.
*G06F 15/167*    (2006.01)
*G06F 13/28*    (2006.01)

(52) U.S. Cl. ...................... 709/213; 709/212; 709/214; 709/216; 709/217; 711/114; 711/162

(58) Field of Classification Search ................ 709/212, 709/213, 217–219; 711/156, 161, 162, 100, 711/114
See application file for complete search history.

(56) References Cited

U.S. PATENT DOCUMENTS

| | | | | |
|---|---|---|---|---|
| 5,504,861 A | * | 4/1996 | Crockett et al. ............... | 714/13 |
| 5,544,347 A | * | 8/1996 | Yanai et al. .................. | 711/162 |
| 6,044,444 A | * | 3/2000 | Ofek ........................... | 711/162 |
| 6,253,295 B1 | * | 6/2001 | Beal et al. .................... | 711/162 |
| 6,366,986 B1 | * | 4/2002 | St. Pierre et al. ............ | 711/162 |
| 6,397,308 B1 | * | 5/2002 | Ofek et al. ................... | 711/162 |
| 6,408,370 B2 | | 6/2002 | Yamamoto et al. | |
| 6,654,752 B2 | * | 11/2003 | Ofek ........................... | 707/10 |
| 7,003,634 B2 | * | 2/2006 | Takeda et al. ............... | 711/148 |
| 2003/0126107 A1 | * | 7/2003 | Yamagami ..................... | 707/1 |
| 2003/0126388 A1 | * | 7/2003 | Yamagami .................. | 711/162 |
| 2004/0098547 A1 | * | 5/2004 | Ofek et al. .................. | 711/162 |
| 2005/0166022 A1 | * | 7/2005 | Watanabe .................... | 711/162 |

FOREIGN PATENT DOCUMENTS

JP    3414218    4/2003

* cited by examiner

*Primary Examiner*—Saleh Najjar
*Assistant Examiner*—Farzana Huq
(74) *Attorney, Agent, or Firm*—Antonelli, Terry, Stout & Kraus, LLP.

(57) ABSTRACT

Composition of a consistency group is changed easily without releasing a volume pair of the consistency group concerning a remote copying system and a remote copying method using a sequence number. In order to change the composition of the consistency group, predetermined data sent from a data sending side after the relevant change is received. At that time, a reflection operation of the predetermined data on a logical storage area is started on a data receiving side after reflection of the predetermined data sent from the data sending side before the relevant change on the logical storage area is terminated.

15 Claims, 20 Drawing Sheets

F I G. 5

| | | | | |
|---|---|---|---|---|
| 510 | CONSISTENCY GROUP ID | | | |
| 520 | PAIRED STATE | | | |
| 530 | LATEST SEQUENCE NUMBER | | | |
| 540 | NON-TRANSFER SEQUENCE NUMBER | | | |
| 550 | FORMALIZED SEQUENCE NUMBER | | | |
| 560 | PAIR VOLUME INFORMATION | PAIR VOLUME 1 | PAIR VOLUME MANAGEMENT INFORMATION ~300 | |
| | | PAIR VOLUME 2 | ... | |
| | | ... | | |
| 570 | PRIMARY JOURNAL VOLUME INFORMATION | PRIMARY STORAGE SYSTEM ID ~571 | | |
| | | PRIMARY JOURNAL VOLUME 1 | JOURNAL VOLUME MANAGEMENT INFORMATION ~400 | |
| | | PRIMARY JOURNAL VOLUME 2 | ... | |
| | | ... | | |
| 580 | SECONDARY JOURNAL VOLUME INFORMATION | SECONDARY STORAGE SYSTEM ID ~581 | | |
| | | SECONDARY JOURNAL VOLUME 1 | JOURNAL VOLUME MANAGEMENT INFORMATION ~400 | |
| | | SECONDARY JOURNAL VOLUME 2 | ... | |
| | | ... | | |

~500

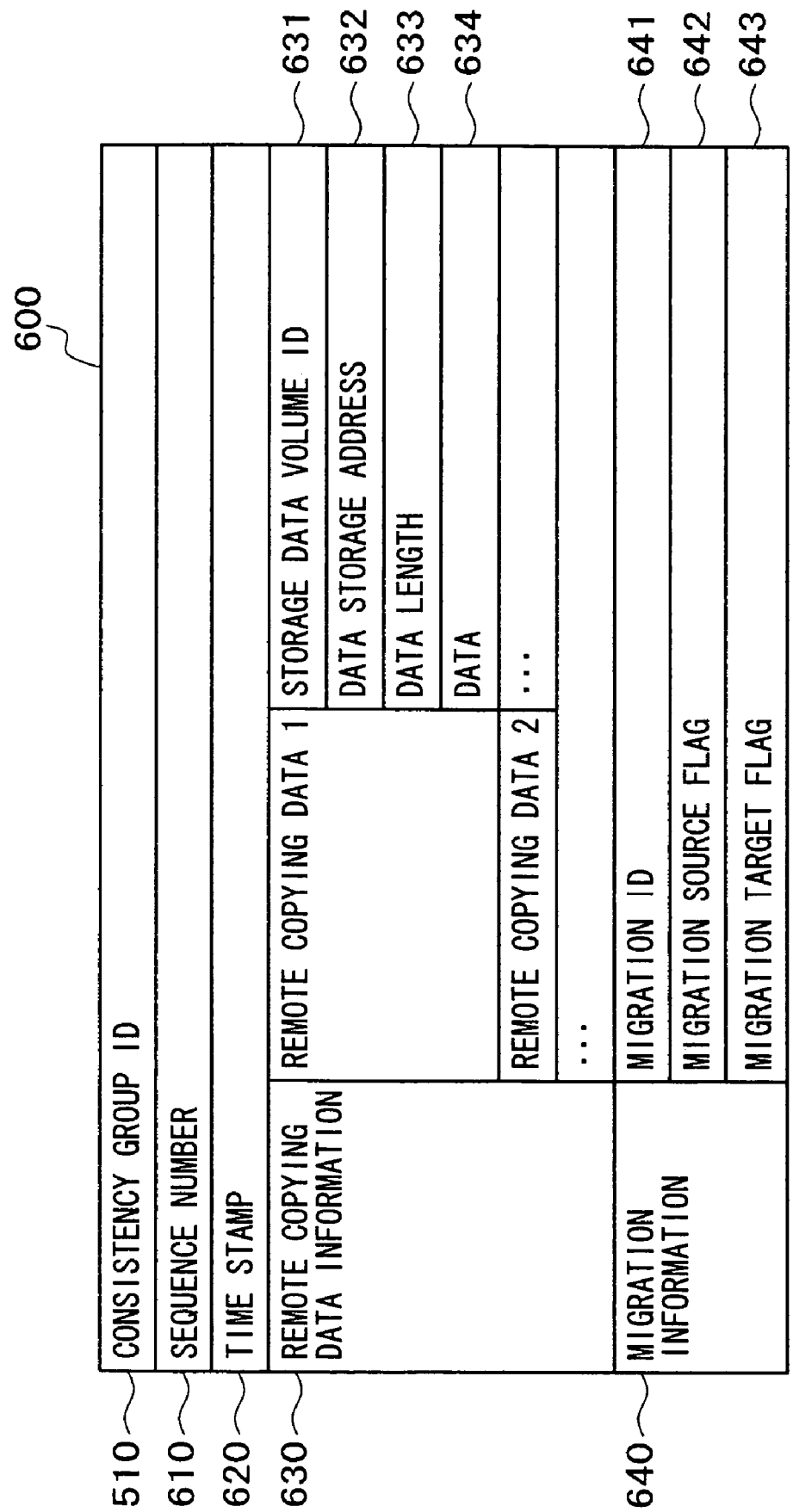

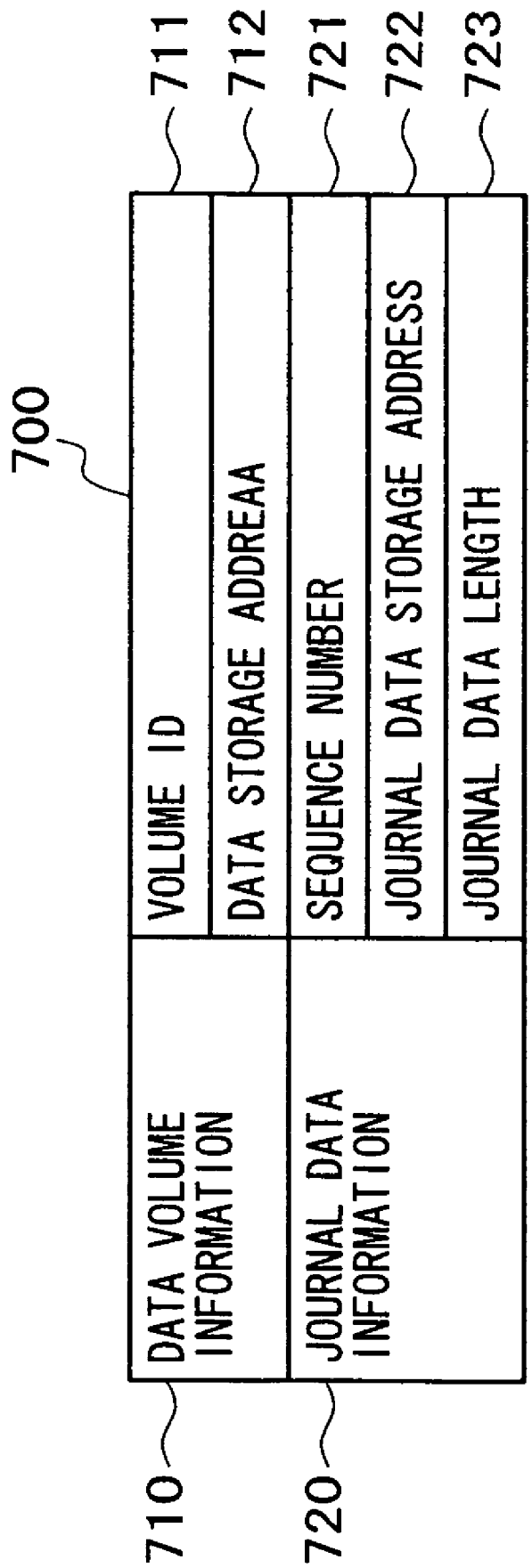

REMOTE COPYING SYSTEM AND REMOTE COPYING METHOD

CROSS-REFERENCE TO RELATED APPLICATION

The present application claims priority from Japanese application JP 2004-285664 filed on Sep. 30, 2004, the content of which is hereby incorporated by reference into this application.

BACKGROUND

The present invention relates to a remote copying system and a remote copying method that duplicate data stored in a storage system in another storage system.

In recent years, in a company or an organization such as a financial institution that possesses a great amount of valuable data, various measures are taken to protect the data from the situation, such as an earthquake, a fire, a large-scale power failure, a terrorist attack, or a viral inflection. As one of the measures, a technology that duplicates the data in a storage system in a remote place, what is called, remote copying (hereinafter referred to as also "RC") can be found.

In RC, a pair is constructed in a unit of volume between respective storage systems on the actual place and in a remote place as a rule, and data is transferred and copied between the pairs. The volume is a logical storage area that stores the data. As hardware, usually, the volume is a magnetic disk, such as a hard disk, but the volume may also be an optical disk other than the magnetic disk.

The relationship between hardware and a volume may also be any case when the hardware is an HDD (hard disk drive). For example, the case applies even if a single volume corresponds to a single HDD, multiple volumes correspond to the single HDD, the single volume corresponds to multiple HDDs, or the multiple volumes correspond to the multiple HDDs.

An example of a data sending procedure by means of RC is described. The case in which a primary site that is the sending side includes a primary host and a primary storage system, and a secondary site that is the receiving side includes a secondary storage system is cited as the example.

First, a write request for data is issued from a primary host to a primary storage system, and then the primary storage system sends the data to a secondary storage system. Further, in this case, for example, the primary host is not concerned directly in data sending. In some cases, the primary storage system that receives the write request may control the data sending.

And, a data sending method by means of RC can be divided roughly into synchronous type RC and asynchronous type RC. In the synchronous type RC, a write request for data is issued from a primary host to a primary storage system, and then, the primary storage system sends the data to a secondary storage system. Subsequently, the secondary storage system sends a receiving completion signal to the primary storage system. The primary storage system receives the receiving completion signal, and sends a write completion signal to the primary host. When the primary host receives a write completion report, the primary host sends next data. Accordingly, with regard to the data, the write request order from the primary host to the primary storage system matches the receiving order of the secondary storage system. However, only after the data is sent to the secondary storage system can the primary host issue the write request of the next data to the primary storage system. Accordingly, in particular, when the data is sent between long distances, the data sending requires much time, and the synchronous type RC is not suitable for the data sending.

On the other hand, in the asynchronous type RC, when a write request for data is issued from a primary host to a primary storage system, the primary storage system returns a write completion signal to the primary host, and accumulates data temporarily. Subsequently, in predetermined timing, the primary storage system sends the data to the secondary storage system in the write request order from the primary host as a rule. Usually, however, multiple communication lines are provided in parallel. The order in which the secondary storage receives the data does not always match the write request order of the primary host according to the communication conditions of each communication line. However, if a sequence number (serial number) is assigned to the data, the data can be rearranged in the original order on the secondary storage system side.

Moreover, JP Patent No. 3414218 (Paragraphs 0013 to 0015, FIG. 1)(Reference 1) proposes a technology. The technology sends data from a primary controller to a secondary controller in accordance with a write request from a host by means of asynchronous type RC. The technology allows the secondary controller to reflect RC data in a secondary controller in the write request order from the host by assigning a time to the data and sending the data.

For example, in the case of RC to which a sequence number is assigned, data that was uniform from a low sequence number is formally reflected (hereinafter referred to as also "formalization") in a storage on the data sending side. Consequently, the data receiving order on the receiving side can match the data sending order on the sending side.

However, as the number of storage hardware products is growing, the probability of a fault of the hardware product increases. Accordingly, a series of sequence numbers is assigned to many volume pairs, and RC is performed. In that case, data is not formalized when even one volume becomes faulty. Consequently, the number of volume pairs to be grouped should not be too numerous.

Moreover, that the data of a secondary storage system is the data of time at which a primary storage system is provided is called "consistency can be found". For example, when the data of a database is stored in a volume, there is the possibility of the volume that stores log data and the volume that stores table data being split into a separate volume. When the data of multiple volumes is the data of a different time in the primary storage system respectively, the database cannot be activated normally in some cases even when the data of the secondary storage system is used.

For instance, a bank account is described as an example. First, 1,000 yen is assumed to have been deposited in an account A, and 2,000 yen is assumed to have been deposited in an account B. In Operation 1, 100 yen is transferred from the account A to the account B, which is regarded as log data. In Operation 2, the account A is rewritten into 900 yen, which is regarded as table data 1. In Operation 3, the account B is rewritten into 1,100 yen, which is regarded as table data 2. Each data item is sent from a primary storage system to a secondary storage system. In this case, when the data is sent in the order of the log data, table data 1, and table data 2, consistency is guaranteed even if communication is interrupted in any point of time.

However, a secondary storage system receives the data in the order of the table data 1, log data, and table data 2, consistency is not always guaranteed. That is, for example, if communication is interrupted when the secondary storage system receives only the table data 1, 900 yen is deposited in the account A, 2,000 yen is deposited in the account B, and there is no log data. In other words, the situation will occur where no consistency can be found, inconsistency can be found in data contents, and recovery is disabled. Accordingly, it is important to uniform multiple volumes and guarantee the consistency. The unity of these volumes is called a consistency group.

Owing to a user's conditions, the composition of a consistency group will have to be changed in some cases. In the past, once a volume pair that migrates the consistency group has been released, the consistency group is migrated. Subsequently, the volume pair was reassembled.

SUMMARY

However, as described above, once a volume pair has been released, the volume pair is reassembled. The work not only takes time, but also all the data of the volume on the sending side has to be recopied into the volume on the receiving side. Furthermore, the work requires both labor and time. Accordingly, the problem of the present invention is to change the composition of a consistency group easily without releasing the volume pair of the consistency group.

In a remote copying system and a remote copying method of the present invention, when the composition of a consistency group is changed, a predetermined formalization operation after the change is started on the receiving side after the predetermined formalization before the change is terminated.

According to the present invention, the composition of a consistency group can be changed easily without releasing a volume pair of the consistency group.

BRIEF DESCRIPTION OF THE DRAWINGS

FIG. 5 is a drawing showing consistency group management information;

FIG. 6 is a drawing showing remote copying data information;

FIG. 7 is a drawing showing journal meta-information;

In a migration example of the consistency group.

In the migration example of the consistency group.

In a split example of the consistency group.

In the split example of the consistency group.

In an integration example of the consistency group.

In the integration example of the consistency group.

In the migration example of the consistency group using the differential copying.

DESCRIPTION OF THE PREFERRED EMBODIMENTS

Figure 1:
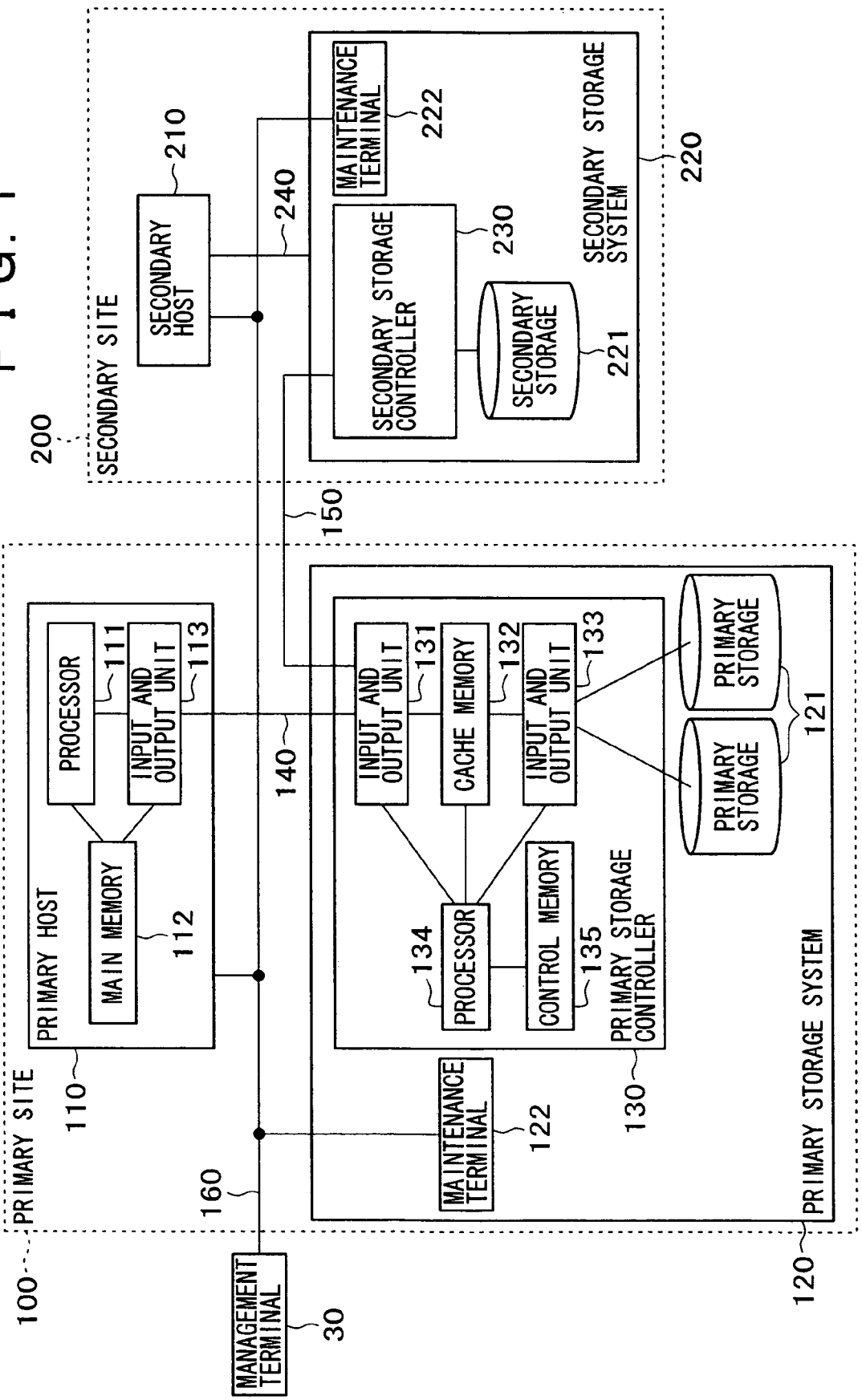
FIG. 1 is a general view showing the hardware composition of a remote copying system according to an embodiment.

The embodiments of the present invention are described in detail referring to the drawings properly. First, the composition is described referring to FIG. 1 to FIG. 10, and then, the operation is described referring to FIG. 11 to FIG. 21.

<<<Composition>>>

<<Overall>>

<Hardware Composition>

FIG. 1 is a general view showing the hardware composition of a remote copying system according to an embodiment. The whole hardware includes a primary site (first site) 100, a secondary site (second site) 200, and a management terminal 30. Each corresponds to the Tokyo Data Center, the Osaka Data Center, and an administrator terminal, for example.

In the remote copying system of this embodiment, an example in which remote copying is performed from the primary site 100 to the secondary site 200 is described. Moreover, a host belonging to the primary site 100 is referred to as a primary host 110, and a storage system belonging to the primary site 100 is referred to as a primary storage system 120. The same is also applied to the secondary site 200.

As shown in FIG. 1, the primary site 100 has the primary host 110 and the primary storage system 120, and the secondary site 200 has a secondary host 210 and a secondary storage system 220. The management terminal 30 is connected to them. Further, the primary site 100 and the secondary site 200 may also have the multiple primary hosts 110 and the multiple secondary hosts 210 respectively.

The primary host 110 is a computer having a processor 111, a main memory 112, and an input and output unit 113. Specifically, the computer is a workstation, a microcomputer, or a mainframe computer. The secondary host 210 also has the same composition though a processor, a main memory, and an input and output unit are not illustrated.

The primary storage system 120 has a primary storage controller 130, one or more primary storages 121, and a maintenance terminal 122. The primary storage 121 is an auxiliary storage such as a magnetic disk storage or an optical disk storage. Moreover, the maintenance terminal 122 may not be provided. The main storage controller 130 has an input and output unit 131, a cache memory 132, an input and output unit 133, a processor 134, and a control memory 135. The secondary storage system 220 is not illustrated specifically, but also has the same composition.

The primary host 110 and the primary storage system 120, and the secondary host 210 and the secondary storage system 220 are interconnected through networks 140 and 240, such as a LAN (local area network) or an SAN (storage area network). Specifically, on the side of the primary site 100, the processor 111 and the main memory 112 of the primary host 110 are connected to the input and output unit 131 of the primary storage system 120 through the input and output unit 113 and the network 140. Even on the side of the secondary site 200, the same composition is applied.

The primary storage system 120 and the secondary storage system 220 are connected through a network 150. In most cases, the network 150 is usually a global network such as a public telephone line. The global network whose distance is separated is used frequently for the purpose of system safety, that is, so that a failure may not occur in both the systems at the same time. When both the respective storage systems 120 and 220 are provided in the same room, the same building, or a neighboring building, a local area network may also be used. Such a network form will not limit the present invention.

The management terminal 30 is a computer having a processor (not illustrated) or a storage (not illustrated). The management terminal 30, the primary host 110, the secondary host 210, the primary storage system 120, and the secondary storage system 220 are interconnected through a network 160 such as a LAN or a WAN (wide area network).

<Functional Composition>

Figure 2:
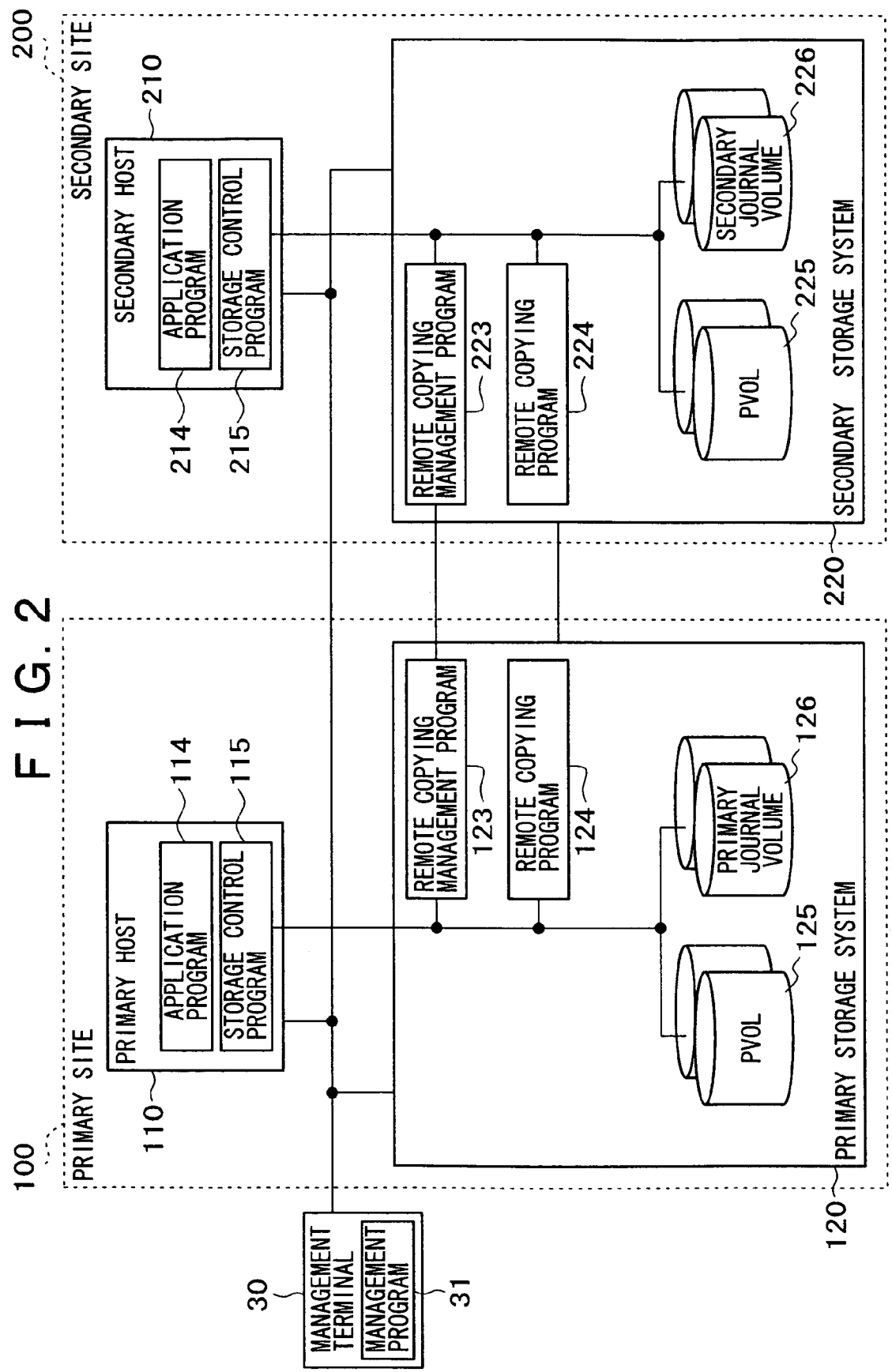
FIG. 2 is a general view showing the functional composition of the remote copying system according to the embodiment.

FIG. 2 is a general view showing a functional composition of a remote copying system according to an embodiment. The function composition is described using FIG. 2 referring to FIG. 1 properly.

The primary storage controller 130 (FIG. 1) executes a remote copying management program 123 and a remote copying program 124 that are programs for controlling data transfer between the primary storage system 120 and the secondary storage system 220, on the processor 134 (FIG. 1). These programs are stored in the control memory 135 (FIG. 1). The same is also applied to a remote copying management program 223 and a remote copying program 224 of a secondary storage controller 230 (FIG. 1).

The remote copying management program 123 manages the remote copying processing the primary storage system 120 executes. The remote copying management program 223 also manages the same processing, and the details are described later. Moreover, during the remote copying processing, communication is performed at all times between the remote copying management program 123 and the remote copying management program 223, and necessary management information is exchanged.

The primary storage controller 130 (FIG. 1) executes input and output processing to and from the primary storage 121 (FIG. 1) based on an instruction from the primary host 110 (FIG. 1) besides the processing regarding the remote copying program 124. The same is also applied to the secondary storage controller 230 (FIG. 1).

The primary storage 121 (FIG. 1) allows one logical storage area (volume) or more to be generated and associated as a PVOL 125, and the secondary storage 221 (FIG. 1) also allows an SVOL 225 to be generated and associated in the same manner.

The primary host 110 executes an application program 114 a user uses, or a storage control program 115 that becomes a control interface to the primary storage system 120, by the processor (FIG. 1). Moreover, the remote copying management program 123 and the storage control program 115 exchange information mutually. The same is also applied to the secondary host 210.

The management terminal 30 executes a management program 31. The management terminal 30 manages each of the hosts 110 and 210 or each of the storage systems 120 and 220 by executing the management program 31. The management program 31 is stored in a storage (not illustrated) of the management terminal 30.

<<Data Structure>>

The data structure used in the remote copying system of this embodiment is described using FIG. 3 to FIG. 9 referring to FIG. 1 and FIG. 2 properly.

<<Pair Volume Management Information>>

Figure 3:
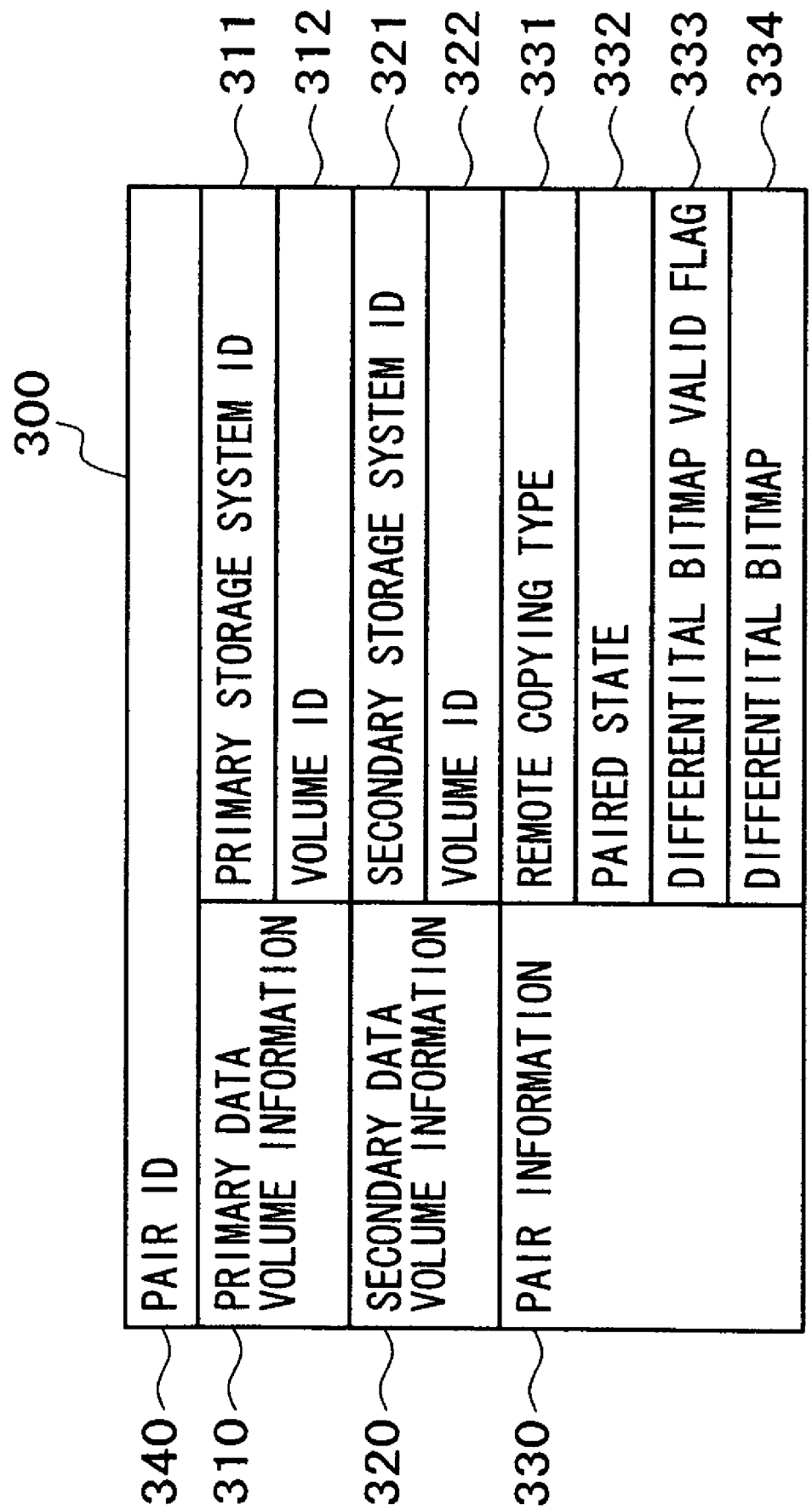
FIG. 3 is a drawing showing pair volume management information.

FIG. 3 is a drawing showing pair volume management information. Pair volume management information 300 manages a remote copying pair, and is included for each remote copying pair volume. This information is stored in the control memory 135 (FIG. 1) of the primary storage system 120 (FIG. 1) and a control memory (not illustrated) of the secondary storage system 220 (FIG. 1).

The pair volume management information 300 includes a pair ID 340 that identifies a pair, primary data volume (PVOL) information 340 that is a duplicate source of the remote copying data inside the primary storage 121 (FIG. 1), secondary data volume (SVOL) information 320 that is a duplicate target of the remote copying data inside the secondary storage 221 (FIG. 1), and pair information 330 that indicates a paired state.

The primary data volume information 310 includes a primary storage system ID 311 and a volume ID 312. The secondary data volume information 320 includes a secondary storage system ID 321 and a volume ID 322.

The primary storage system ID 311 and the secondary storage system ID 321 are identifiers in the respective storage systems 120 and 220 in which the relevant volume can be found. The volume IDs 312 and 322 are the identifiers of the relevant volume inside the respective storage systems 120 and 220 (FIG. 1). The relevant volume is decided uniquely based on each of these IDs.

The pair information 330 includes a remote copying type 331, a paired state 332, a differential bitmap valid flag 333, and a differential bitmap 334.

The remote copying type 331 indicates any of three types of remote coping of "synchronous", "non-journal type asynchronous", and "journal type asynchronous". These details are described later.

The paired state 332 indicates any of "PAIR" in which a data volume is usually performing copying, "COPY" in which the data volume is performing differential copying, and "SUSPEND" in which copy processing is stopped and enters a suspended state for the reason of a volume or path blockade.

Before the differential bitmap valid flag 333 is described, differential copying is described. In the differential copying, first, each volume on the sending side and the receiving side are split into multiple areas. When data is updated on the receiving side, the relevant areas are rewritten, and their data is accumulated without being sent. Moreover, the differential copying is called differential management. Subsequently, the data of only the area that was rewritten in predetermined timing is sent. Moreover, this is called the differential copying. The differential copying, as an advantage, reduces a greater amount of data to be sent than normal copying when the data is frequently rewritten to the same area. Further, the differential copying is a publicly known technology, and, therefore, the details are not described.

The differential bitmap valid flag 333 indicates whether the value of the differential bitmap 334 described next is valid. When all the differential bits that indicate the presence of rewriting per multiple area in which a volume is split are off (no rewriting), the differential bitmap valid flag 333 turns off. When even one differential bit is on, the differential bitmap valid flag 333 turns on.

The differential bitmap 334 is bitmap information that indicates an area in which there is a difference in the data of the PVOL 125 (FIG. 2) and SVOL 225 (FIG. 2), that is, the area in which the data was rewritten in the PVOL 125 (FIG. 2). When the data was in the PVOL 125 (FIG. 2) during SUSPEND, the differential bit that indicates the area in which the data was updated turns on. And, after SUSPEND, a pair can be restored to a duplicated state by copying (differentially copying) the area alone in which a bit is on. This processing is performed based on a bitmap in which the OR (logical sum) between the differential bitmap 334 of the PVOL 125 (FIG. 2) and the differential bitmap of the SVOL 225 (FIG. 2) is obtained.

Further, the OR between the differential bitmap 334 of the PVOL 125 (FIG. 2) and the differential bitmap of the SVOL 225 (FIG. 2) is obtained because this operation is required when the SVOL 225 (FIG. 2) performs rewriting in the secondary site 200 independently of the primary site 100, and the operation can be omitted when not required. In the case of differential copying, when a differential bit is turned off, and all differential bits turnoff in the area in which a copy is completed, the differential copying is completed. Moreover, when a volume pair is generated, all the differential bitmaps are turned on and differential copying is performed (initial copy). This operation can copy all the areas of the PVOL 125 (FIG. 2) into the SVOL 225 (FIG. 2).

Next, the processing when the PVOL 125 (FIG. 2) during differential copying receives a write request from the primary host 110 is described. In the area in which a differential bit is on, when the PVOL 125 receives a write request from the primary host 110, the area data is copied by the differential copying later, remote copying is not performed immediately. Subsequently, when the write request is received from the primary host 110 in the area in which the differential bit is OFF, the remote copying is performed immediately. When all the differential bits turn off, the differential copying is terminated, and the differential bitmap valid flag 333 turns off, then processing enters a "PAIR" state in which only normal remote copying operates.

<Journal Volume Management Information>

Figure 4:
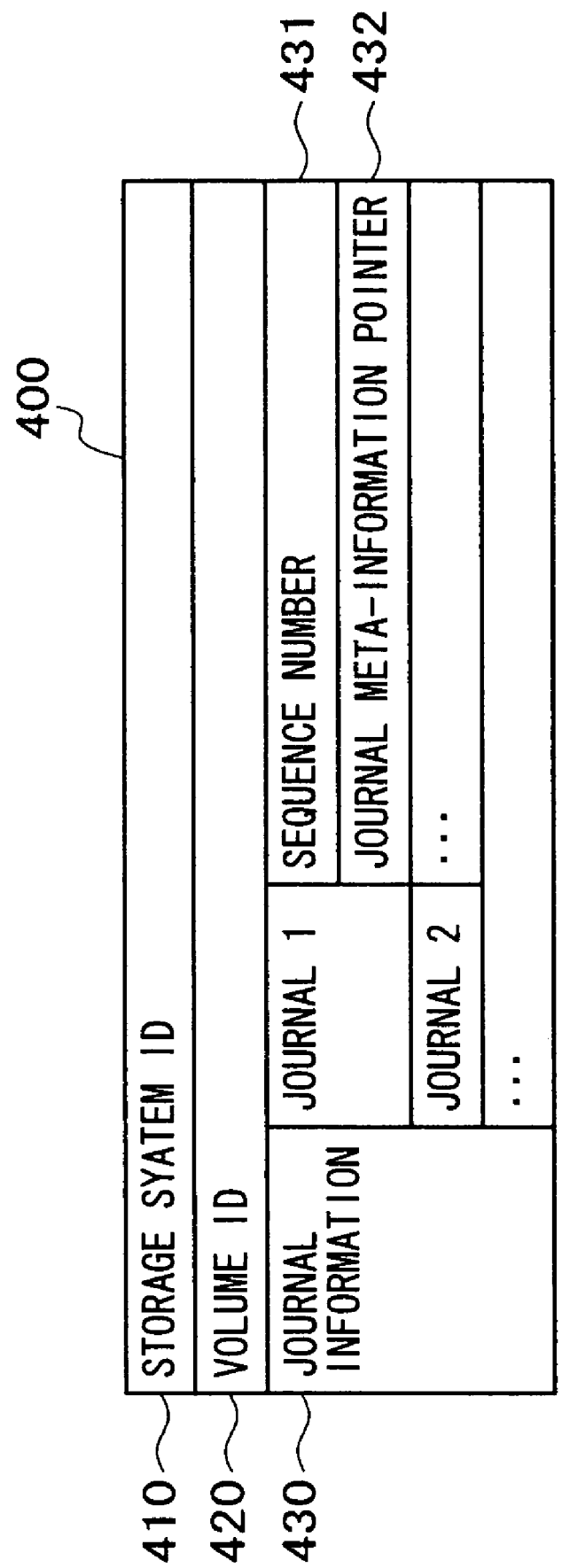
FIG. 4 is a drawing showing journal volume management information.

FIG. 4 is a drawing showing journal volume management information. Journal volume management information 400 manages a volume (journal volume) that stores a remote copying journal. A journal and journal data are update histories of the data stored in the primary storage system 120 (FIG. 1). For example, a write request time is added to remote copying data. The journal volume management information 400 is included for each journal volume, and stored in the control memory 135 (FIG. 1) of the primary storage system 120 (FIG. 1) and a control memory (not illustrated) of the secondary storage system 220 (FIG. 1).

The journal volume management information 400 includes a storage system ID 410, a volume ID 420, and journal information 430. The storage system ID 410 identifies each of the storage systems 120 and 220 (FIG. 1). The volume ID 420 identifies a journal volume in each of the storage systems 120 and 220 (FIG. 1).

The journal information 430 includes a sequence number 431 and a journal meta-information pointer 432 of each journal stored in a journal volume. The journal meta-information pointer 432 indicates a location of the journal meta-information. The details of the sequence number 431 and the journal information are described later.

<Consistency Group Management Information>

FIG. 5 is a drawing showing consistency group management information. Consistency group management information 500 manages a consistency group, and is stored in the control memory 135 (FIG. 1) of the primary storage system 120 (FIG. 1) and a control memory (not illustrated) of the secondary storage system 220 (FIG. 1).

The consistency group management information 500 includes a consistency group ID 510, a paired state 520, a latest sequence number 530, a non-transferred sequence number 540, a formalized sequence number 550, pair volume information 560, primary journal volume information 570, and secondary journal volume information 580.

The data in which a write request from the primary host 110 is received to a primary volume inside a consistency group is copied into a secondary volume that is the remote copying pair of each primary volume, retaining a write request order inside the consistency group. To retain the write request order, a sequence number 610 described later is assigned to each remote copying data.

The secondary storage system 220 (FIG. 1) can reflect the remote copying data whose sequence number 610 was uniform in the SVOL 225. The remote copying data from which the low sequence number 610 is missing is not reflected. As described above, the processing that reflects the remote copying data determined to be reflectible by this secondary storage system 220 (FIG. 1) is called "formalization".

The consistency group ID 510 decides a consistency group uniquely. The paired state 520 indicates any state of "PAIR" in which all the pair volumes inside the consistency group is in a duplicated state, "COPY" in which one pair volume or more inside the consistency group is being copied differentially, "SUSPEND" in which all the pair volumes inside the consistency group are in a suspended state (consistency can be found in the consistency group), and "SUSPEND-E" in which one pair volume or more inside the consistency group is in a suspended state (consistency cannot be found in the consistency group).

The latest sequence number 530 is assigned most recently in the sequence number 610 assigned to the remote copying data of the consistency group by the primary storage system 120 (FIG. 1).

The non-transferred sequence number 540 is the oldest number 610 in the sequence number 610 of the remote copying data that is not transferred from the primary storage system 120 (FIG. 1) to the secondary storage system 220 (FIG. 1). The primary storage system 120 sequentially transfers the remote copying data having the oldest sequence number 610 in the non-transferred remote copying data 610.

The formalized sequence number 550 is the newest sequence number 610 in the remote copying data formalized by the secondary storage system 220 (FIG. 1). The pair volume information 560 includes the pair volume management information 300 included in the consistency group.

The primary journal volume information 570 includes a primary storage system ID 571 and the journal volume management information 400 of each journal volume included in the consistency group. The secondary journal volume information 580 includes a secondary storage system ID 581 and the journal volume management information 400 of each journal volume included in the consistency group. The primary storage system ID 571 and the secondary storage system ID 581 are the identifiers of each of the storage systems 120 and 220 (FIG. 1) including the journal volume.

Further, when a remote copying type is "synchronous" RC or "non-journal type asynchronous" RC, a journal volume is not used. Accordingly, the primary journal volume information 570 and the secondary journal volume 580 need not be provided.

<Remote Copying Data>

FIG. 6 is a drawing showing remote copying data information. Remote copying data 600 is transferred from the primary storage system 120 (FIG. 1) to the secondary storage system 220 (FIG. 1). The remote copying data 600 includes the consistency group ID 510, the sequence number 610, a time stamp 620, remote copying data information 630, and migration information 640.

The consistency group ID 510 identifies a consistency group as described above. The sequence number 610 is a sequence number assigned to retain a write request order inside the consistency group.

The time stamp 620 is information that indicates time at which a data write request is received from the primary host 110 in the primary storage system 120 (FIG. 1). The time stamp 620 is utilized to know that the data of the secondary storage system 220 (FIG. 1) is the data of which time of the primary storage system 120 (FIG. 1).

The remote copying data information 630 includes a storage data volume ID 631, a data storage address 632, data length 633, and data 634 of each of multiple remote copying data items. The storage data volume ID 631 indicates the SVOL 225 (FIG. 2) in the secondary storage system 220(FIG. 2). The data storage address 632 indicates a place where write data is written to the SVOL 225 (FIG. 2). The data length 633 indicates a write data size. The data 634 is a data copy written to the PVOL 125 (FIG. 2), and the SVOL 225 (FIG. 2) is write-updated in the same manner as the PVOL 125 (FIG. 2).

Further, remote copying data may be both one data item and multiple data items. When the remote copying data 600 is generated per single write from the primary host 110 to the PVOL 125 (FIG. 2), the remote copying data becomes one data item. When a write request in which the primary storage system 120 (FIG. 1) receives from the primary host 110 (FIG. 1) within a time interval (for example, an interval of 10 seconds) is uniformed and the remote copying data 600 is generated, the remote copying data becomes multiple data items. In this case, the remote copying data may even be the same as the write data from the primary host 110 (FIG. 1).

Otherwise, the remote copying data may also be differential copying data in which the area updated from the primary host 110 (FIG. 1) is stored as a difference, and may be used as such differential copying data in which the area of the difference is copied. When the write requests from the multiple primary hosts 110 (FIG. 1) are provided in the same area, the same area is regarded as the difference. Consequently, an amount of remote copying data can be reduced.

The migration information 640 includes a migration ID 641, a migration source flag 642, and a migration target flag 643. The migration information 640 is utilized when the processing that migrates a pair volume from a consistency group including a pair volume to another consistency group. The details of the consistency group migration processing is described later.

<Journal Meta-Data>

FIG. 7 is a drawing showing journal meta-data. Journal meta-data 700 is management information for associating data and a journal, and includes data volume information 710 and journal data information 720.

The data volume information 710 includes a volume ID 711 that indicates a data volume in which data is updated, and a data storage address 712 that indicates a head address in which the data on the data volume is stored.

The journal data information 720 includes a sequence number 721 that is a sequence number of remote copying data in a consistency group allocated in journal acquisition, a journal data storage address 722 that indicates a head address in which the journal data on a journal volume is stored, and data length 723 of the journal data. Further, the journal data information 720 may also include journal acquisition time in addition.

<Correspondence of Journal Meta-Data, a Data Volume, and Journal Data>

Figure 8:
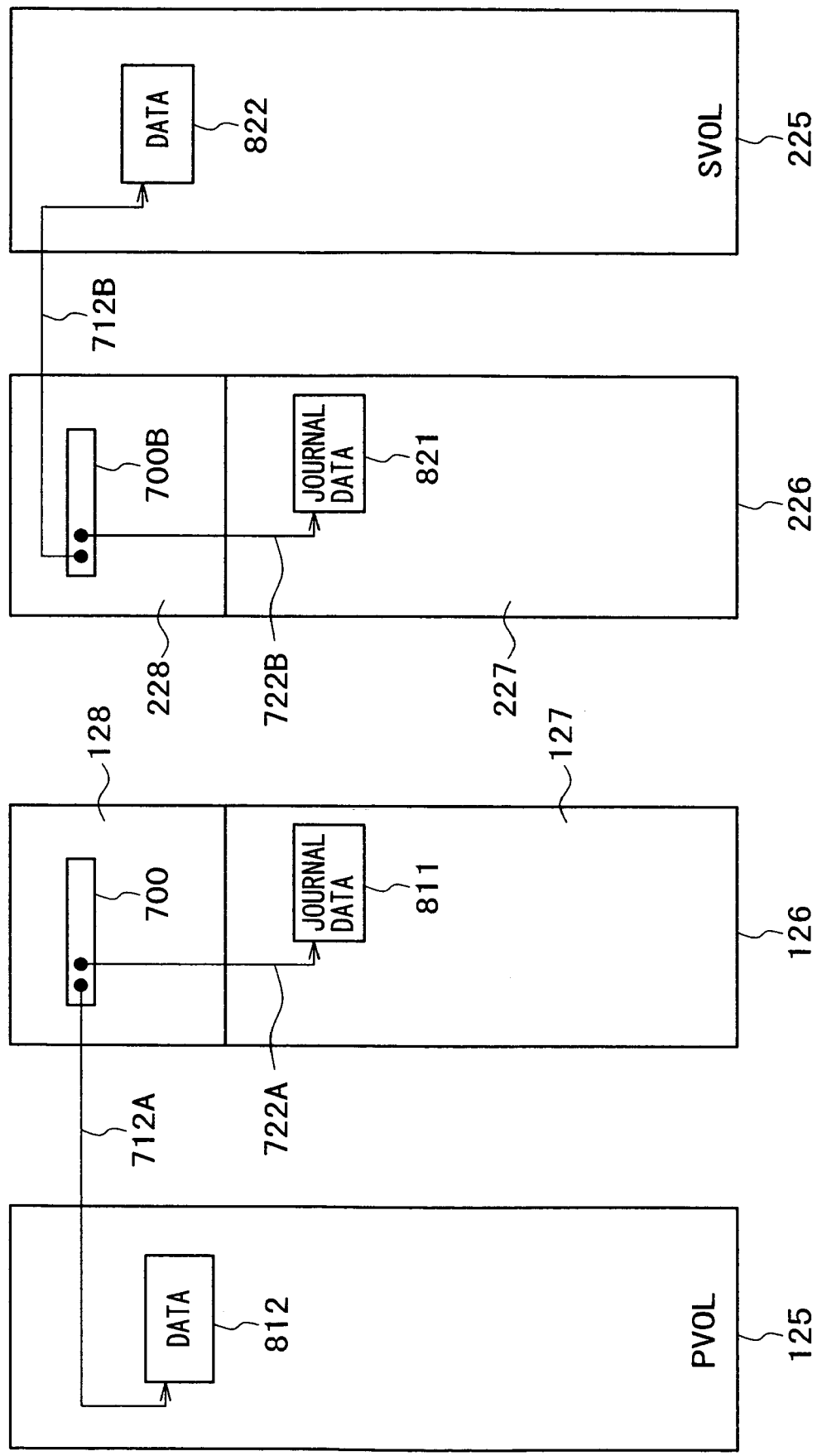
FIG. 8 is a drawing showing the correspondence between journal meta-data, a data volume, and journal data.

FIG. 8 is a drawing showing the correspondence of journal meta-data, a data volume, and journal data. Usually, the PVOL 125 (FIG. 2), the SVOL 225 (FIG. 2), and a journal volume are managed in a unit of a predetermined logical block respectively (for example, 512 bytes). A logical block address is assigned to each logical block.

A primary journal volume 126 has a journal data area 128, and a journal data area 127. The journal data area 127 stores a duplicate copy of the aforementioned journal data 811, that is, data 812 written to the PVOL 125 by a write request from the primary host 110. The journal meta-data 700 includes the data storage address 712 of update data, and the journal data storage address 722.

A secondary journal volume 226 also has a journal meta-data area 228 and a journal data area 227 in the same manner as the primary journal volume 126. The journal meta-data area 228 address-converts and stores the journal meta-data 700 transferred from the journal meta-data area 128 of the primary journal volume 126. The journal data area 227 stores the remote copying data transferred from the journal data area of the primary journal volume 126 as journal data 821.

The journal meta-data 700 has the information about the data update performed in the PVOL 125, and the journal data storage address 722 (FIG. 7) that is the address information is rewritten to the address of the secondary journal volume 226 in which the corresponding journal data 821 is stored. Furthermore, the update in the PVOL 125 can be reflected in the SVOL 225 by copying the journal data 821 from the journal data area 227 of the secondary journal volume 226 to the address of the SVOL 225 that corresponds to the data storage address 712 (FIG. 7).

Further, the data length of the journal meta-data 700 is fixed. However, because the journal data length 723 (FIG. 7) depends on the data updated according to a write request from the primary host 110, the length is not fixed. Moreover, when a journal volume is defined, each of the storage systems 120 and 220 (FIG. 1) configures each of the journal meta-data areas 128 and 228 and each of the journal data areas 127 and 227 to each of the journal volumes 126 and 226 that is set.

<Migration Command>

Figure 9:
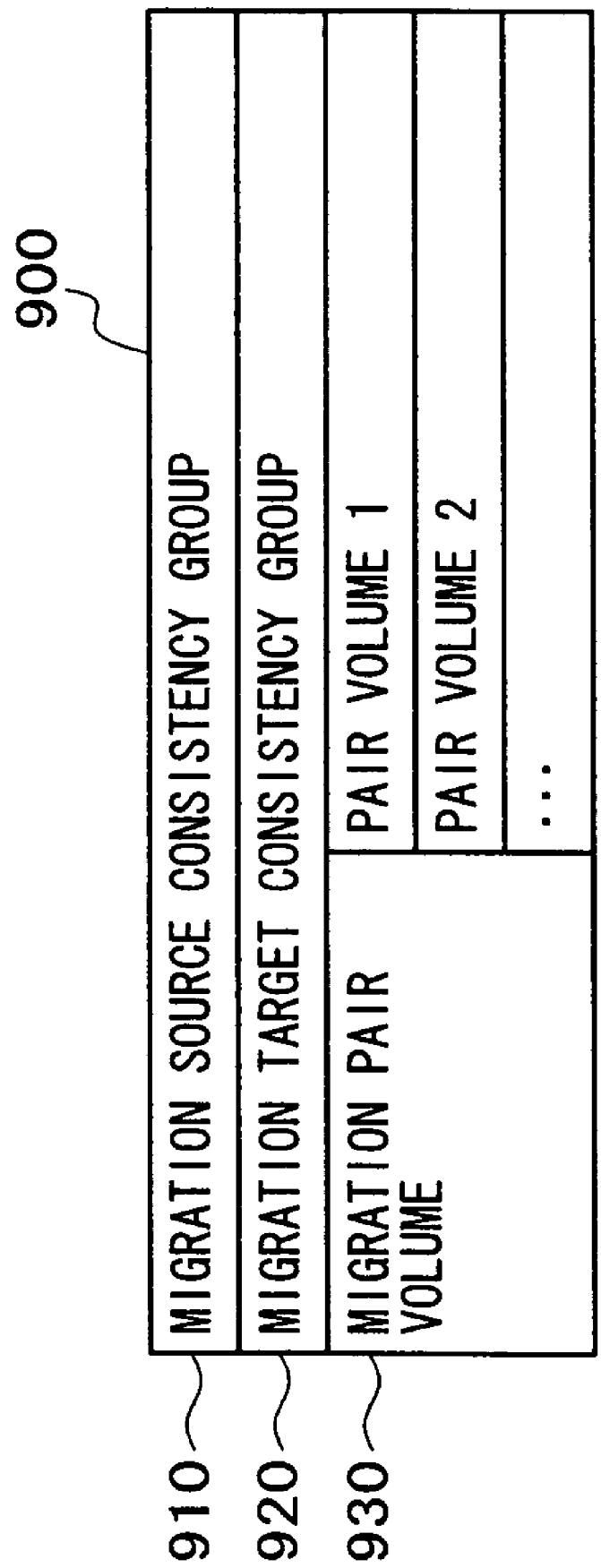
FIG. 9 is a drawing showing a consistency group migration command.

FIG. 9 is a drawing showing an input item of a consistency group migration command. A migration command 900 includes information that indicates a migration source consistency group 910, a migration target consistency group 920, and a migration pair volume 930.

The migration source consistency group 910 and the migration target consistency group 920 enter the relevant consistency group ID from the consistency group ID 510 of the consistency group management information 500 (FIG. 5). The migration pair volume 930 indicates a pair volume to be migrated, and may include multiple pair volumes. The migration pair volume 930 enters the relevant ID from the pair ID 340 (FIG. 3) of the pair volume management information 300 (FIG. 3).

<Migration Concept of a Consistency Group>

Figure 10:
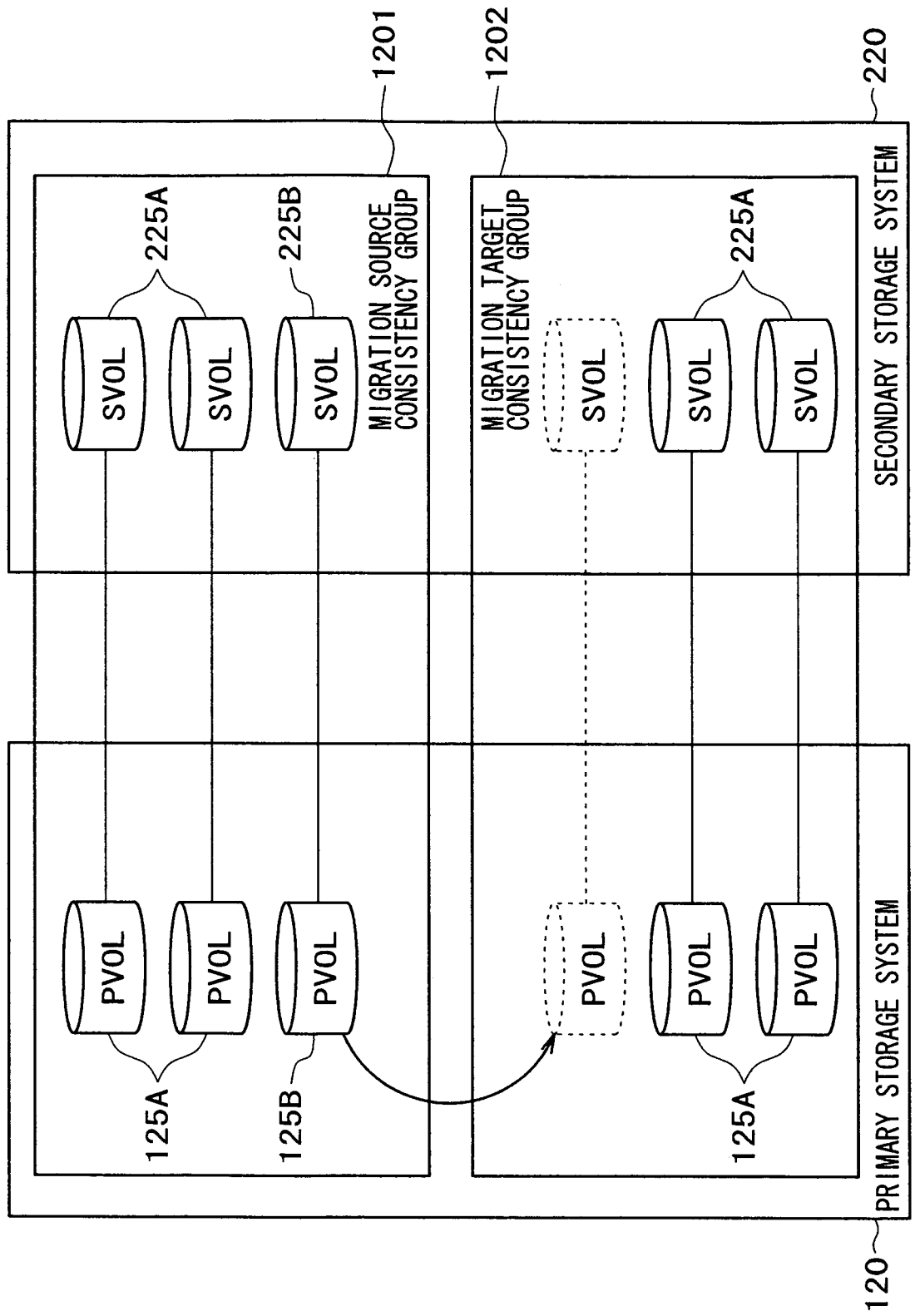
FIG. 10 is a conceptual illustration showing the migration of the consistency group.

FIG. 10 is a conceptual drawing showing the migration of a consistency group. Each of the PVOL 125A and 125B, and each of the SVOL 225A and 225B are pair volumes of remote copying. The case in which the pair volumes 125B to 225B are migrated to the consistency group is described here.

The migration pair volumes 125B to 225B are migrated from a migration source consistency group 1201 to a migration target consistency group 1202 that is another consistency group. Further, in FIG. 10, only one migration pair volume is written, but multiple migration pair volumes may be migrated collectively. Moreover, in the case of a pair volume of synchronous remote copying, the PVOL 125 of the primary storage system 120 (FIG. 1) and the SVOL 225 of the secondary storage system 220 (FIG. 1) are regarded as the same data contents, and need not necessarily be assigned to the consistency group. Accordingly, the migration source consistency group 1201 may not be provided.

<<<Operation>>>

The description of the composition has been made, and subsequently, the operation is described. Remote copying is described using FIG. 11 and FIG. 12, and the change of a consistency group is described using FIG. 13 to FIG. 21.

<<Remote Copying Processing>>

Remote copying processing is divided roughly into two types of journal type asynchronous RC, and synchronous and asynchronous type asynchronous RC, and each RC is described below.

<Journal Type Asynchronous Remote Copying>

Figure 11:
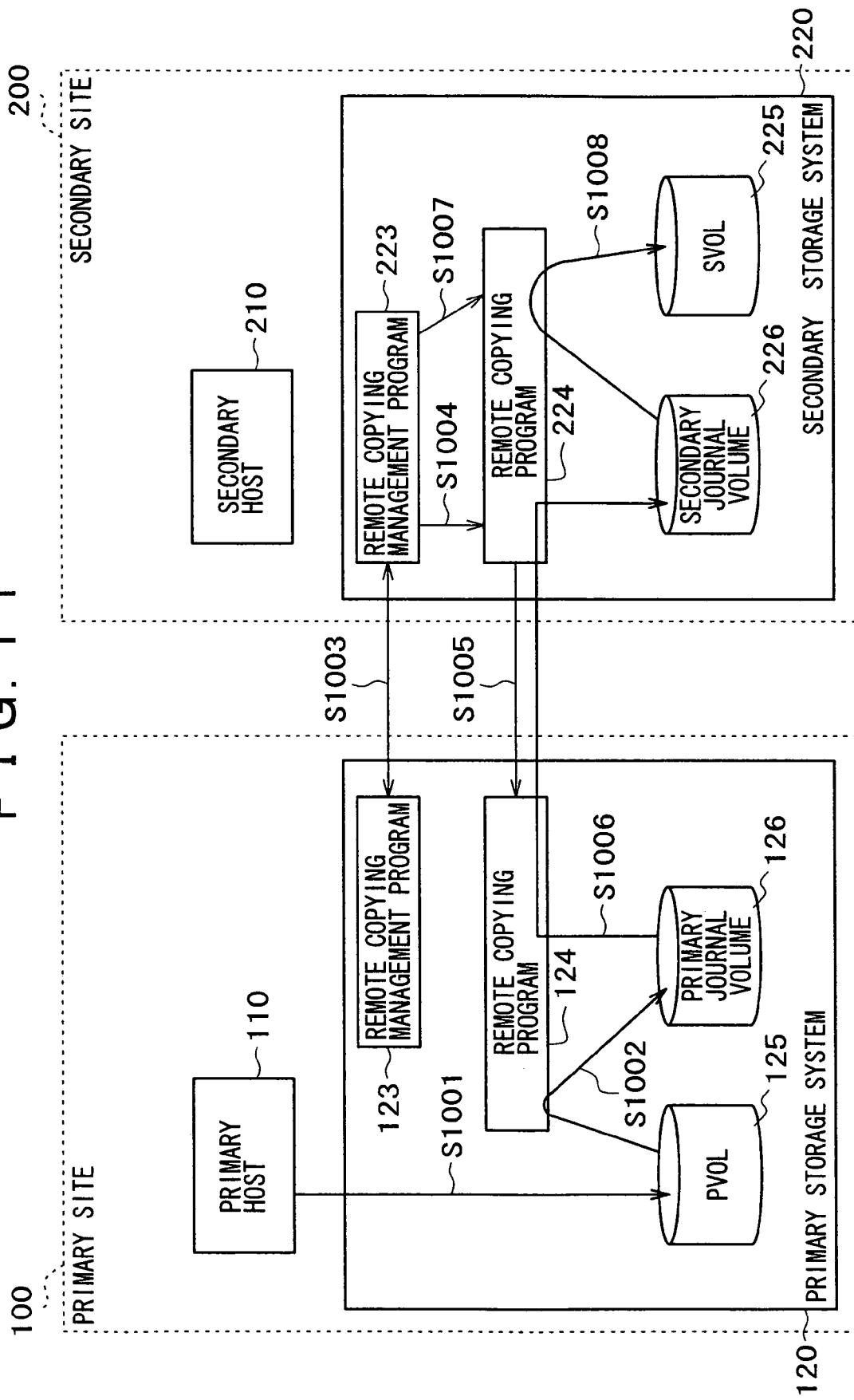
FIG. 11 shows a processing flow of journal type asynchronous remote copying.

FIG. 11 is a processing flow of journal type asynchronous remote copying. The primary storage system 120 and the secondary storage system 220 execute the remote copying management programs 123 and 223 respectively, and perform the remote copying processing.

First, an outline is described. The primary storage system 120 stores a duplicate copy of the data written to the PVOL 125 in a primary journal volume 126 as journal data by executing the remote copying program 124. Moreover, the primary storage system 120 also stores the journal meta-data 700 (FIG. 7) in the primary journal volume 126 as a part of the journal data. These types of processing are called journal acquisition processing.

On the other hand, the secondary storage system 220 executes the remote copying program 224, and reflects the data updated by the PVOL 125 in the SVOL 225 based on the journal data stored in the primary journal volume 226. These types of processing are called journal reflection processing. The journal reflection processing will not reflect the journal data from which the low sequence number 610 (FIG. 6) is missing.

Subsequently, each operation is described sequentially. When the primary storage system 120 starts the journal acquisition processing of the PVOL 125, the primary storage system 120 generates journal data in accordance with the write processing (S1001) of the data to the PVOL 125 from the primary host 110, and stores the generated journal data in the primary journal volume 126 (S1002). At this point, the remote copying program 124 acquires information such as the latest sequence number 530 (FIG. 5) from the consistency group management information 500 (FIG. 5) stored on the control memory 135 (FIG. 1) of the primary storage system 120, decides a storage target of the journal data, and generates the journal meta-data 700 (FIG. 7).

The secondary storage system 220 executes the remote copying management program 223, and acquires the information about journal data creation conditions (for example, the capacity of journal data, and the oldest time of the journal data inside the primary journal volume 126) from the primary storage system 120 (S1003).

The secondary storage system 220 executes the remote copying management program 223, and issues a journal data transfer request to the remote copying program 224 of the secondary storage system 220. This processing is performed in accordance with input of a user's instruction given through a GUI (graphical user interface) from the maintenance terminal 122. Otherwise, the processing is performed in accordance with a predetermined schedule (for example, when a fixed amount of journal data is stored in a journal volume by the primary storage system 120, or for each period) (S1004).

A journal data transfer request includes journal data to be copied, the primary journal volume 126 in which the journal data is stored, information that identifies the primary storage system 120 having the primary journal volume 126, and information that specifies the secondary journal volume 226 in which the copied journal data is stored. These types of information are generated from the information that the remote copying management program 123 acquires from the consistency group management information 500 (FIG. 5) on the control memory 135 (FIG. 1).

The remote copying program 224 that receives a journal data transfer request issues a read command to the primary storage system 120 (S1005). The primary storage system 120 that receives this read command sends the journal data specified with the read command to the secondary storage system 220 as the remote copying data 600 (FIG. 6) (S1006). The secondary storage system that receives the journal data stores the received journal data in the secondary journal volume 226 specified with the journal data transfer request (journal transfer processing).

Further, journal transfer may also be realized by executing the remote copying management program 123 and the remote copying program 124 of the primary storage system 120 here, and allowing the primary storage system 120 to issue a write request to the secondary storage system 220.

Subsequently, the remote copying management program 223 of the secondary storage system 220 issues a journal reflection request to the remote copying program 224 of the secondary system 220 (S1007). The remote copying program 224 that receives the journal reflection request reflects data in the SVOL 225 based on the journal data of the secondary journal volume 226 (journal reflection processing) (S1008).

Further, each of the journal volumes 126 and 226 is a logical area. Accordingly, journal acquisition processing, journal transfer processing, and journal reflection processing may also be performed using the journal data on the cache memory 132 (FIG. 1) before the memory is stored in the physical storage 121 (FIG. 1) and a cache memory (not illustrated) of the secondary storage system 220.

<Synchronous Remote Copying and Non-Journal Type Asynchronous Remote Copying>

Figure 12:
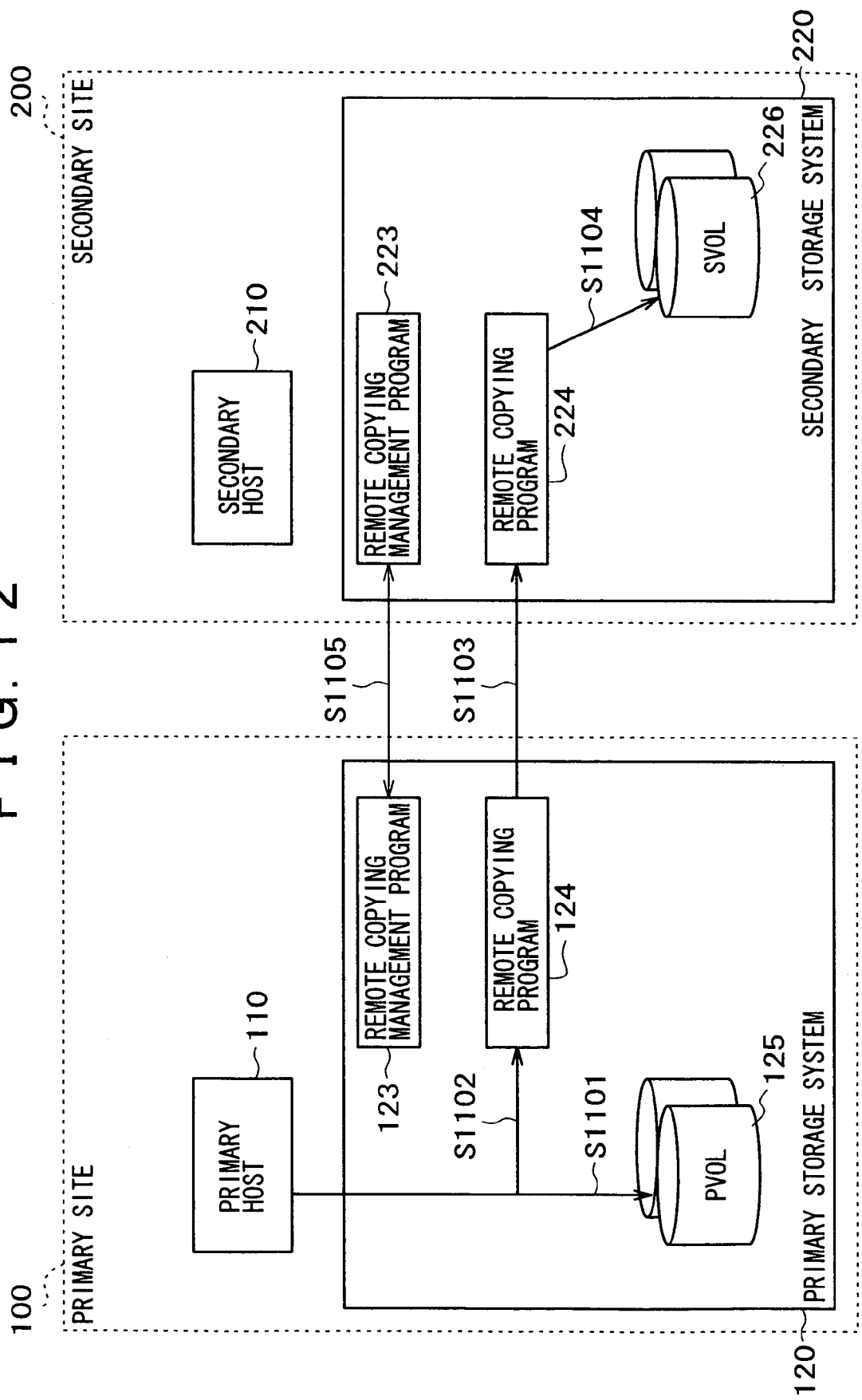
FIG. 12 shows a processing flow of synchronous remote copying and non-journal type asynchronous remote copying.

FIG. 12 is a processing flow of synchronous remote copying and non-journal type asynchronous remote copying. The primary storage system 120 and the secondary storage system 220 execute the remote copying management programs 123 and 223 respectively, and perform remote copying processing.

Each operation is described sequentially. The primary storage system 120 executes the remote copying program 124 in accordance with the write processing (S1101) of data to the PVOL 125 from the primary host 110, and transfers a duplicate copy of the data written to the PVOL 125 to the secondary storage system 220 as the remote copying data 600 (FIG. 6) (S1102 and S1103). Further, at this point, multiple write data may also be transferred collectively.

The secondary storage system 220 executes the remote copying program 224, and reflects the sequence number 610 (FIG. 6) that was uniform from the lower one of the remote copying data 600 (FIG. 6) in the SVOL 226, that is, performs formalization (S1104).

On the other hand, the remote copying management program 123 of the primary storage system 120 and the remote copying management program 223 of the secondary storage system 220 exchange information about copy conditions of remote copying (S1105). The information exchanged specifically is the latest sequence number of the remote copying data 600 (FIG. 6) whose formalization is performed by the secondary storage system 220.

<<Change of a Consistency Group>>

Next, a change of a consistency group is described. Remote copying processing types include journal type asynchronous remote copying, and synchronous and non-journal type asynchronous remote copying, as described above. The change of the consistency group is described citing the non-journal type asynchronous remote copying as an example. The change of the consistency group described below can also be applied in the journal type asynchronous remote copying in the same manner. Moreover, even when the synchronous remote copying coexists, the change of the consistency group can be applied in the same manner.

In order to change a consistency group, a user inputs a migration command (FIG. 9) of the consistency group to the primary storage system 120 (FIG. 1) using a GUI (not illustrated) in the primary host 110 (FIG. 1), the management terminal 30 (FIG. 1) or the maintenance terminal 122 (FIG. 1).

In the following example, the case in which a consistency group is changed while the multiple remote copying data 600 (FIG. 6) are being sent continuously from the primary storage system 120 (FIG. 1) to the secondary storage system 220 (FIG. 1) is described referring to FIG. 1 properly. Further, the remote copying data 600 (FIG. 6) is abbreviated as RC data below.

<Migration Example of a Consistency Group>

Figure 13A:
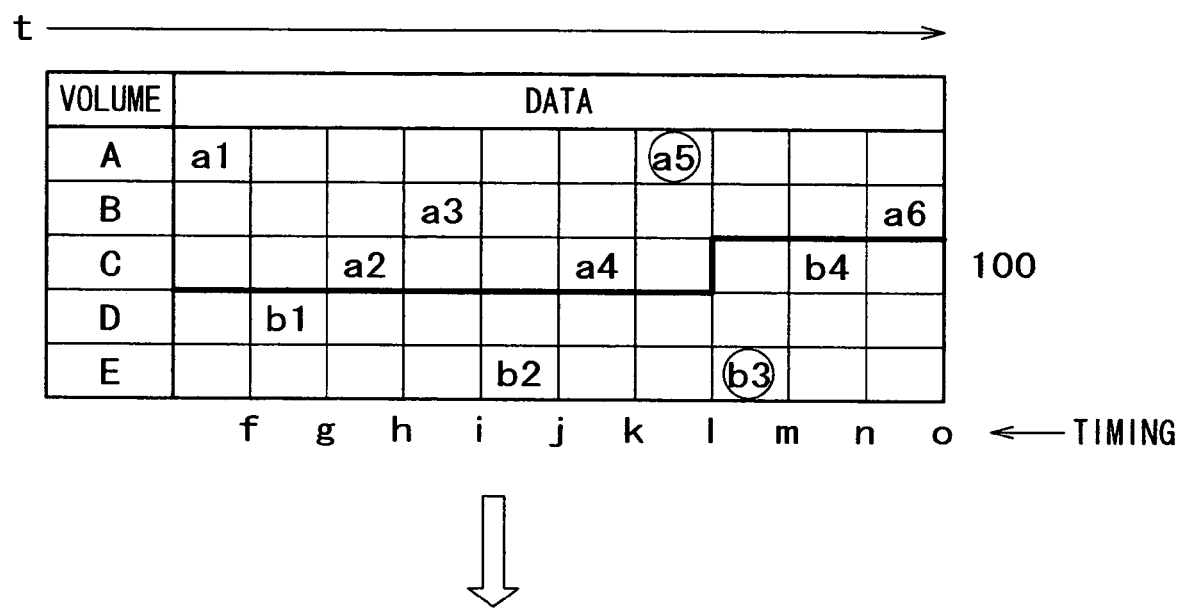
FIG. 13A is a drawing showing an order of a write request for data to a primary storage system by a primary host using a sequence number in a time series.
Figure 13B:
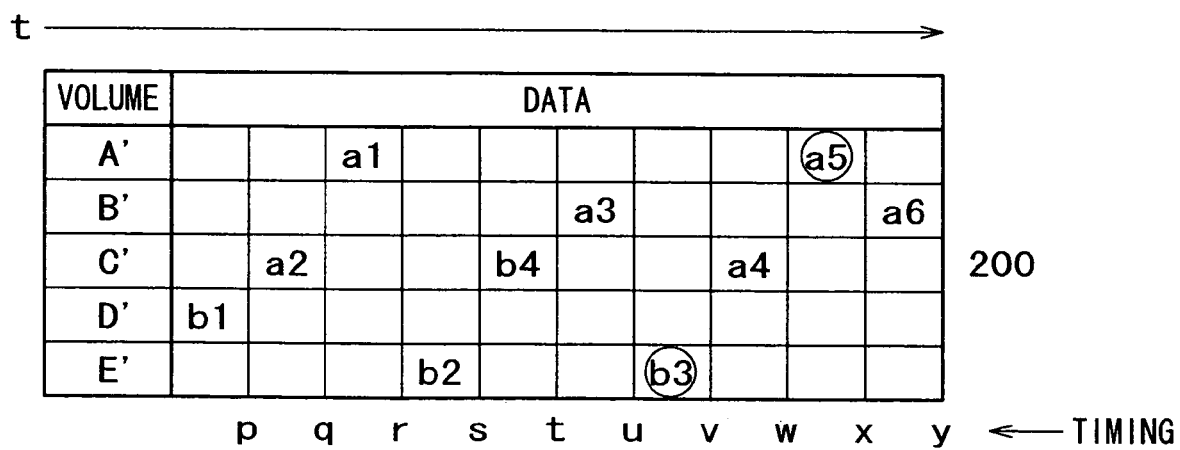
FIG. 13B is a drawing showing the order in which a secondary storage system receives RC data using the sequence number in the time series.

An example in which a specific volume pair migrates a consistency group is described referring to FIGS. 13A and 13B. FIG. 13A is a drawing showing a write request order into the primary storage system 120 by the primary host 110 of the primary site 100 using the sequence number 610 of RC data in a time series.

Volumes A, B, C, D, and E inside the primary storage 121 of the primary site 100 are paired with volumes A', B', C', D', and E' inside secondary storage 221 of the secondary site 200 respectively (similar even in another example below). First, a pair of the volumes A, B, and C belongs to a consistency group a, and a pair of the volumes D and E belongs to a consistency group b. The sequence number 610 is assigned as a1, a2, . . . in the consistency group a, and assigned as b1, b2, . . . in the consistency group b. That is, a write request occurs in the order of a1, b1, a2, a3, . . . on the side of the primary site 100.

At timing "1", while a write request is being issued in the primary site 100, based on a command issued to the primary storage system 120 from a user through the primary host 110, the management terminal 30, or the maintenance terminal 122, the pair of the volume C migrates from the consistency group a to the consistency group b. Accordingly, at the timing "1" or later, the sequence number 610 of b is assigned to the data sent from the volume C to the volume C'.

According to communication conditions of the network 150 that is a communication line, the secondary storage system 220 is assumed to have received data in the order of (b1, a2, a1, b2 . . . ) from the left of FIG. 13B.

Figure 14A:
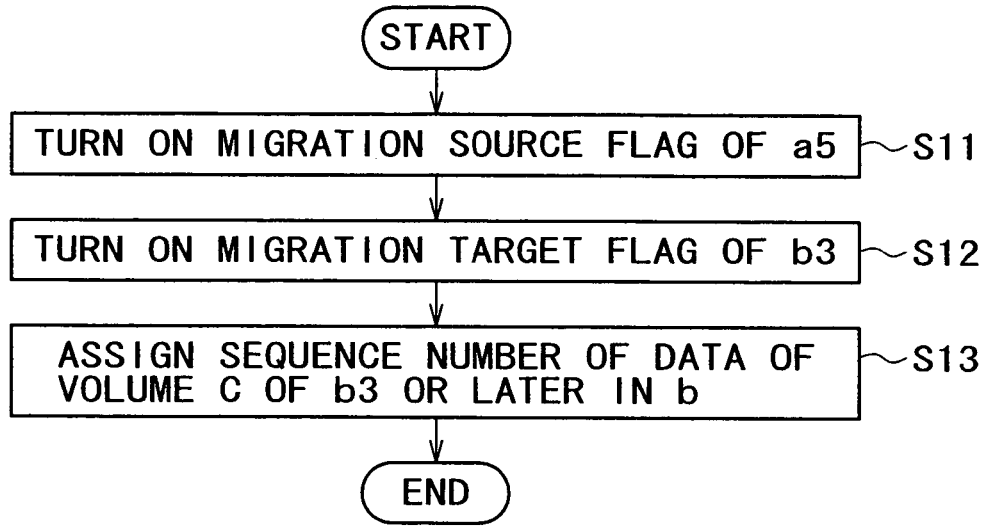
FIG. 14A is a flowchart showing a control flow on the primary storage system side.
Figure 14B:
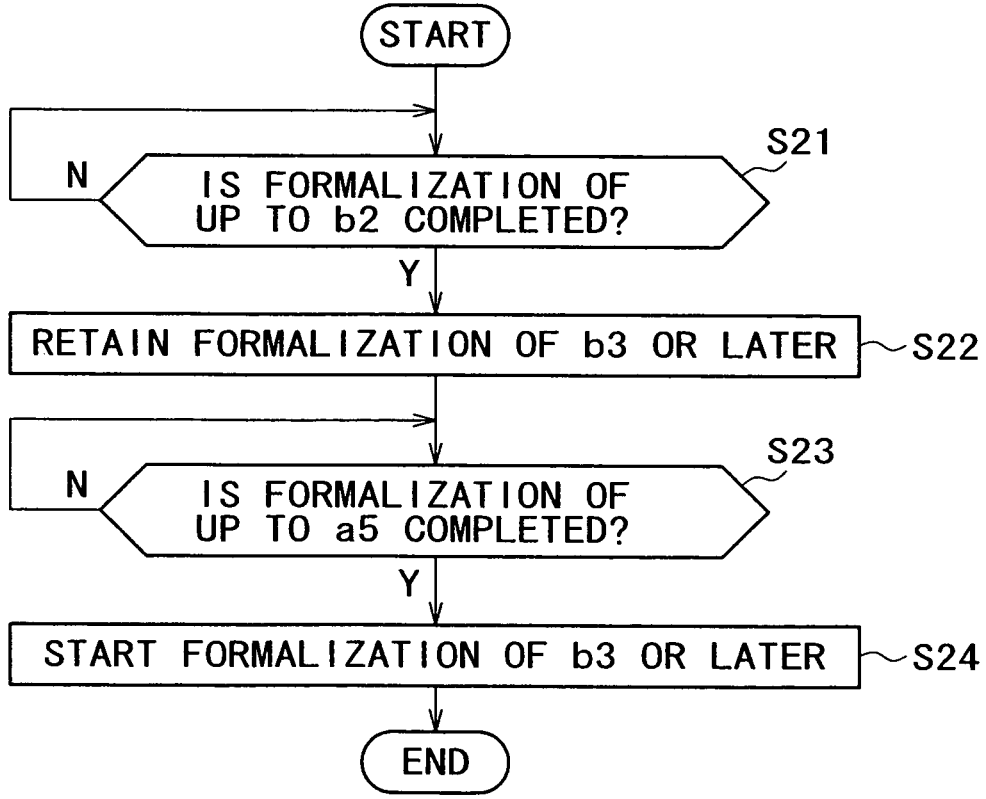
FIG. 14B is a flowchart showing the control flow on the secondary storage system side.

Next, the control in the primary storage system 120 and the secondary storage system 220 when RC data is sent and received as shown in FIGS. 13A and 13B is described referring to FIGS. 14A and 14B.

[Control Flow on the Side of the Primary Storage System 120]

FIG. 14A is a flowchart showing a control flow on the side of the primary storage system 120. The primary storage system 120 sends RC data to the secondary storage system 220 sequentially. At this time, because the RC data of a5 is the RC data immediately before a consistency group migration point of time (timing "1") in the consistency group a before the migration of the pair of the volume C, the migration source flag 642 is turned on (S11).

Next, because the RC data of b3 is the RC data immediately after the migration timing "1" in the consistency group b after the pair of the volume C migrates, the migration target flag 643 is turned on (S12). After this S12, because the pair of the volume C belongs to the consistency group b, the sequence number 610 of the RC data of the volume C is assigned in b (S13).

That is, each RC data item is sent from the side of the primary storage system 120, specific data (a5 and b3 in this case) before and after the consistency group migration timing "1" is marked so that the RC data may be formalized correctly on the side of the receiving secondary storage system 220.

[Control on the Side of the Secondary Storage System 220]

Next, the control on the side of the secondary storage system 220 is described. The secondary storage system receives RC data in the order (b1, a2, a1, b2, . . . ) of FIG. 13B. With regard to the received RC data, when the RC data of the lower sequence number 610 than the received RC data is all uniform in each consistency group, the RC data is stored in the volume that corresponds to the secondary storage 221. For example, when a1, a2, and a3 are uniform when the RC data of a4 was received, the RC data of a4 is stored in the secondary storage 221. When the RC data of the lower sequence number 610 than the sequence number 610 of the received RC data is not uniform, the received data is stored temporarily on a cache memory (not illustrated). These types of processing are the normal control in the secondary storage system 220, and such processing as shown in FIG. 14B is performed in addition.

FIG. 14B is a flowchart showing the control flow on the side of the secondary storage system 220. First, in the consistency group b that is the consistency group after the volume C migrates, whether the formalization of up to b2 which is the RC data one before b3 which is the RC data to which the migration target flag 643 is assigned is completed, that is, b1 and b2 are uniform is determined (S21). When the formalization of up to b2 is completed, the formalization of b3 or later of the consistency group b is retained (S22). Subsequently, in the consistency group a, when the formalization of up to data a5 to which the migration source flag 642 is assigned is completed (S23), and the formalization of b3 or later of the consistency group b is started (S24).

Accordingly, in the volume C', b4 is not reflected earlier than a4, and the consistency group of the pair of the volume C can be migrated without any problem. That is, when the processing of FIGS. 14A and 14B is not performed, b4 is reflected earlier than a4. Moreover, the RC data to which the migration source flag 642 or the migration target flag 643 is assigned may be designated by allowing the secondary storage system 220 to receive their RC data. Otherwise, apart from the designation, the designation may be reported previously from the primary storage system 120 to the secondary storage system 220. Further, a migration example of one volume is shown here, but even multiple volumes can be migrated in the same manner.

<Split Example of a Consistency Group>

Subsequently, a split example of a consistency group is described referring to FIGS. 15A and 15B, and FIGS. 16A and 16B. Further, there are many parts common to the above <A migration example of a consistency group>, and the common parts are described omitting them partly.

Figure 15A:
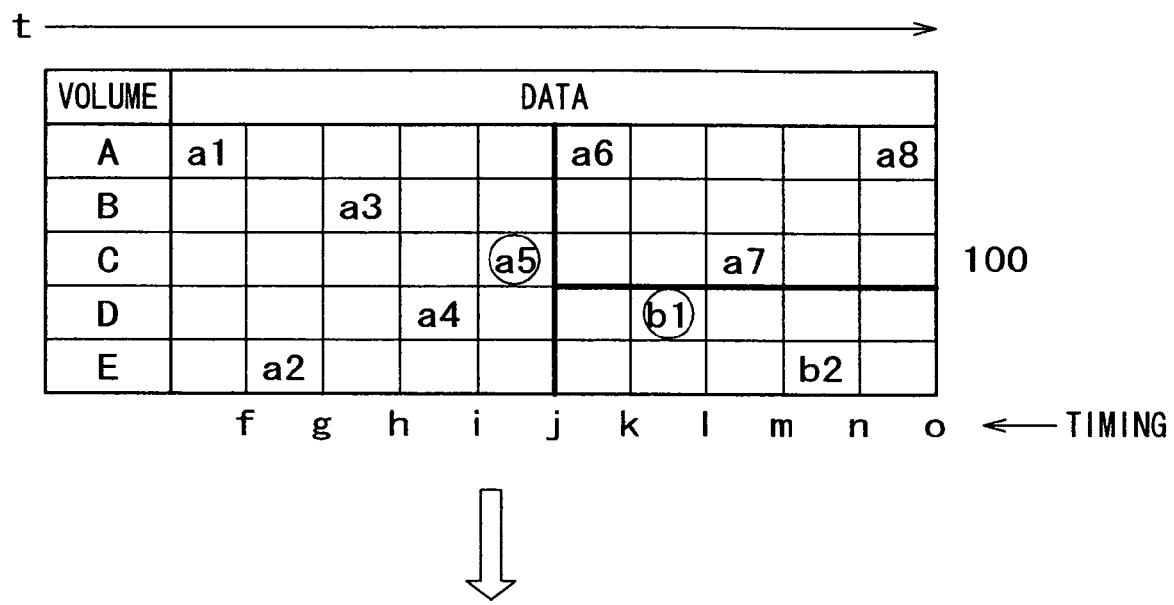
FIG. 15A is a drawing showing the order of the write request for the data to the primary storage system by the primary host using the sequence number in the time series.

FIG. 15A shows the RC data to which a write request is issued by the primary host 110 using the sequence number 610 in a time series. In FIG. 15A, a pair of the volumes A, B, C, D, and E belongs to the consistency group a up to timing "j". The pair of the volumes A, B, and C remains in the consistency a from timing "j". On the other hand, the pair of the volumes D and E belongs to the consistency group b, and, subsequently, the sequence number 610 is assigned in the consistency group b. The secondary storage system 220 is assumed to have received RC data in the order of FIG. 13B.

Figure 15B:
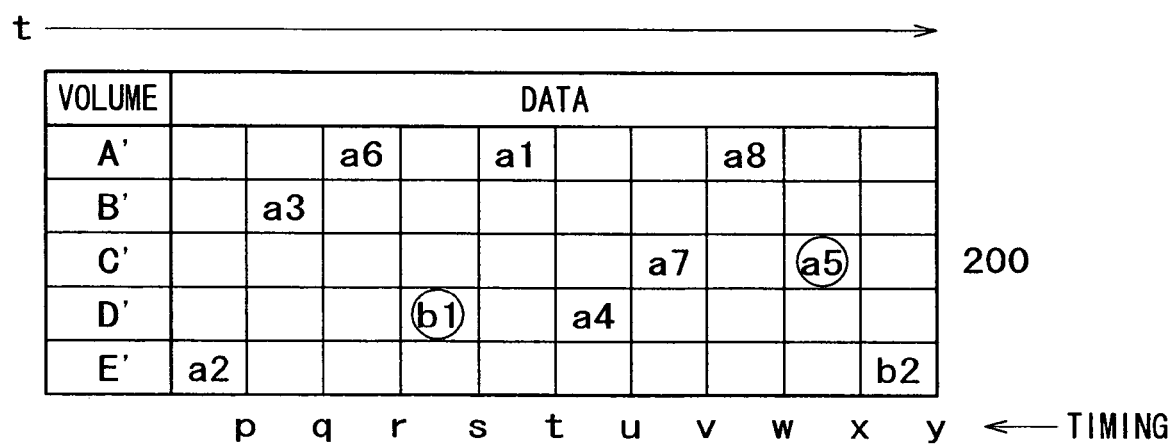
FIG. 15B is a drawing showing the order in which the secondary storage system receives the RC data using the sequence number in the time series.
Figure 16A:
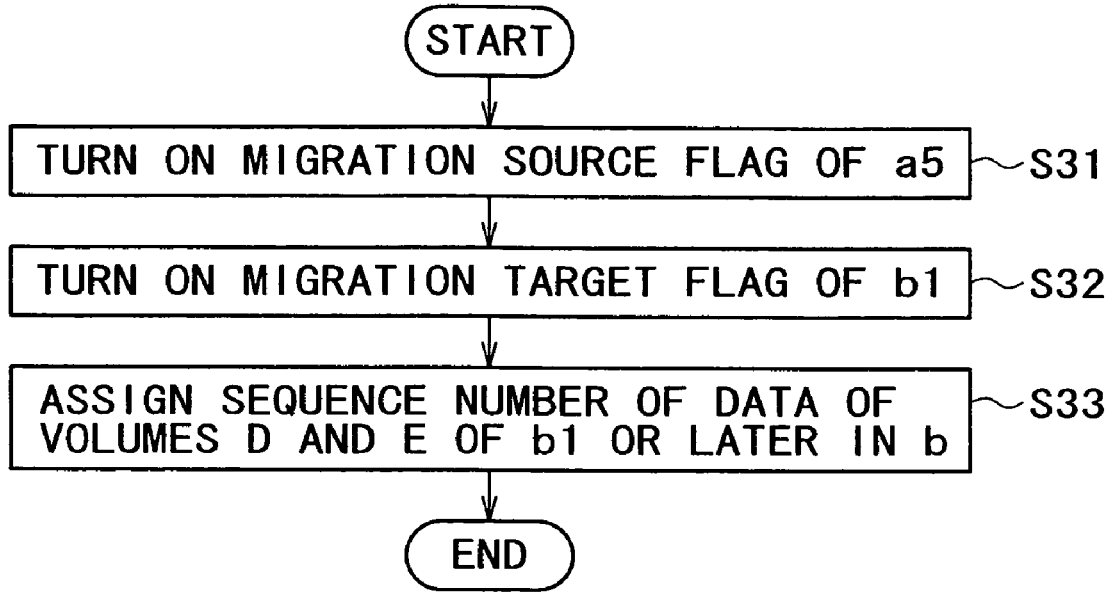
FIG. 16A is a flowchart showing the control flow on the primary storage system side.
Figure 16B:
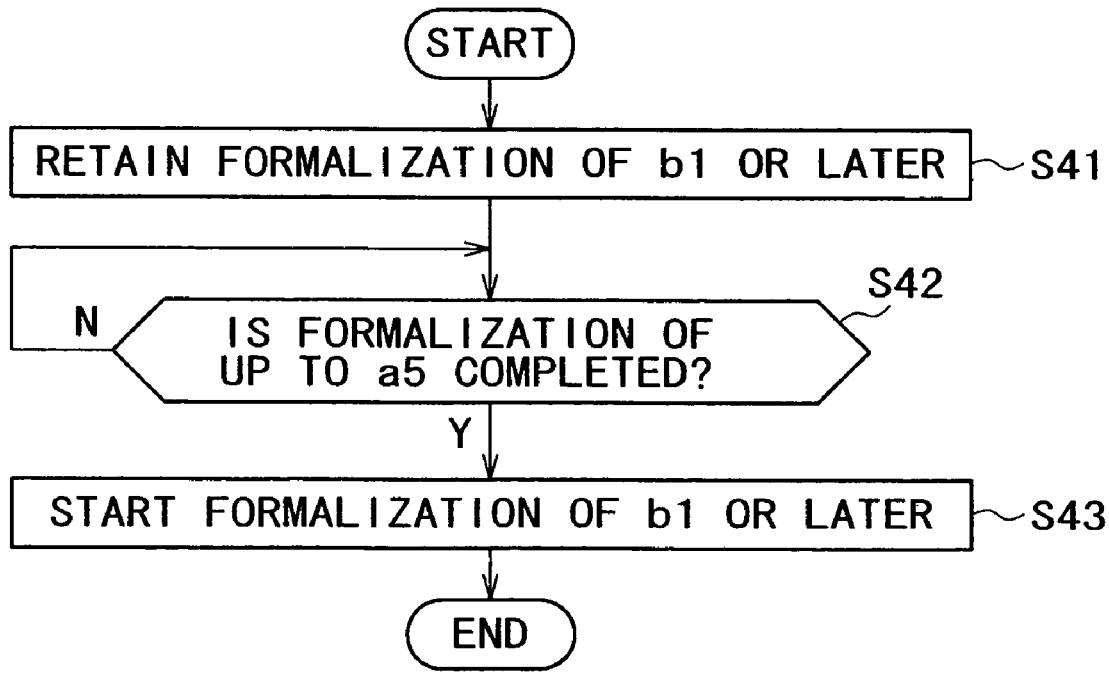
FIG. 16B is a flowchart showing the control flow on the secondary storage system side.

Next, the control in the primary storage system 120 and the secondary storage system 220 when the RC data shown in FIGS. 15A and 15B is received is described referring to FIGS. 16A and 16B.

[Control Flow on the Side of the Primary Storage System 120]

FIG. 16A is a flowchart showing the control flow on the side of the primary storage system 120. The primary storage system 120 sends RC data to the side of the secondary site 200 sequentially. At this time, the primary storage system turns on the migration source flag 642 (S31) because the RC data of a5 is the RC data immediately before the consistency group split point of time (timing "j").

Next, since the RC data of b1 is the first RC data of the consistency group b that is a new consistency group after the consistency group is split, the migration target flag 643 is turned on (S32). Since the pair of the volumes D and E belongs to the consistency group b after this S32, the sequence number 310 of the RC data of the volumes D and E is assigned in b (S33).

That is, when each RC data item is sent from the side of the primary storage system 120, the specific data (a5 and b1 in this case) before and after the consistency group split timing "j" is marked so that the RC data on the side of the receiving secondary storage system 220 may be formalized correctly.

[Control on the Side of the Secondary Storage System 220]

Next, the control on the side of the secondary storage system 220 is described. The secondary storage system receives RC data in the order (a2, a3, a6, b1, ... ). With regard to the received RC data, when the RC data of the lower sequence number than the received RC data is all uniform in each consistency group, the RC data is stored in the volume that corresponds to the secondary storage 221. When the RC data of the lower sequence number 610 than the sequence number of the received RC data is not uniform, the received data is stored temporarily on a cache memory (not illustrated). These types of processing are the normal control in the secondary storage system 220, and such processing as shown in FIG. 16B is performed in addition.

FIG. 16B is a flowchart showing the control f low on the side of the secondary storage system 220. First, the formalization of b1 or later of the consistency group b is retained (S41). That is, even if b1 or later is uniform, b1 or later is not reflected in the secondary storage 221. In the consistency group a, when the formalization of up to a5 is completed (S42), the formalization of b1 or later of the consistency group b is started (S43).

Accordingly, in the volume D', b1 is not reflected earlier than a4, and a consistency group can be split without any problem. That is, when the processing of FIGS. 16A and 16B is not performed, b1 is reflected earlier than a4. Further, an example in which the consistency group is split into two is shown here. However, even when the consistency group is split into three or more, the migration source flag 642 is turned on. Otherwise, the consistency group can be split in two stages or more.

<Integration Example of a Consistency Group>

Subsequently, an integration example of a consistency group is described referring to FIGS. 17A and 17B, and FIGS. 18A and 18B. Further, there are many parts common to the above <Migration example of a consistency group>, and the common parts are described omitting them partly.

Figure 17A:
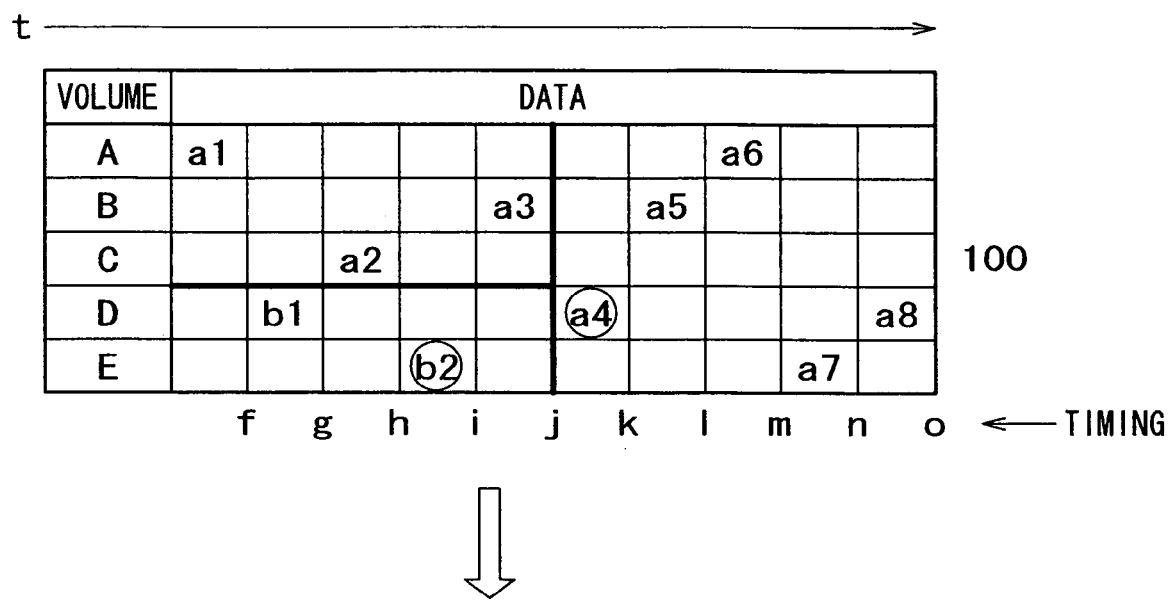
FIG. 17A is a drawing showing the order of the write request for the data to the primary storage system by the primary host using the sequence number in the time series.
Figure 17B:
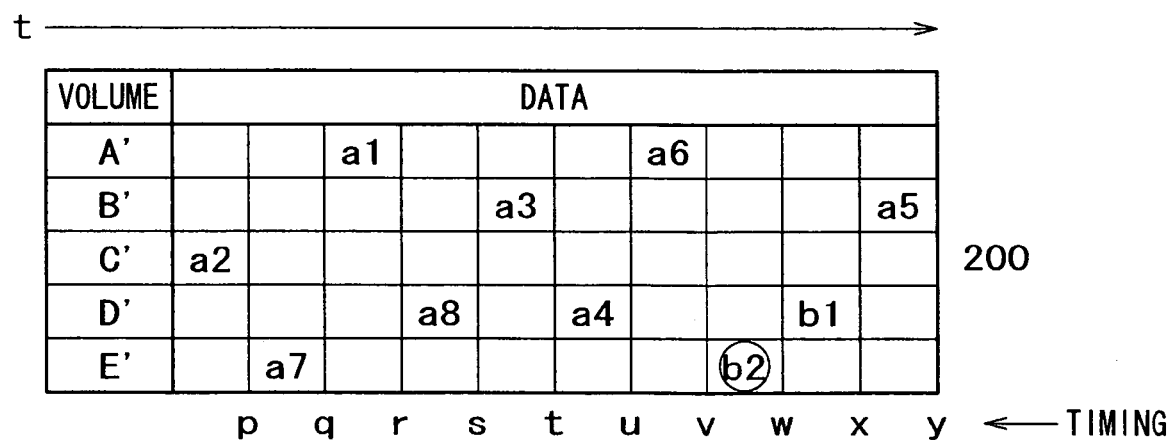
FIG. 17b is a drawing showing the order in which the secondary storage system receives the RC data using the sequence number in the time series.

FIGS. 17A and 17B show RC data for which a write request was issued by the primary host 110 using the sequence number 610 in a time series in the same manner as FIGS. 13A and 13B. In FIG. 17A, up to the timing "j", a pair of the volumes A, B, and C belongs to the consistency group a up to the timing "j", and a pair of the volumes D and E belongs to the consistency group b. From the timing "j", the pair of the volumes A, B, C, D, and E is all integrated with the consistency group a, and the sequence number 610 is assigned in a. And, the secondary storage system 220 is assumed to have received RC data in the order of FIG. 17B.

Figure 18A:
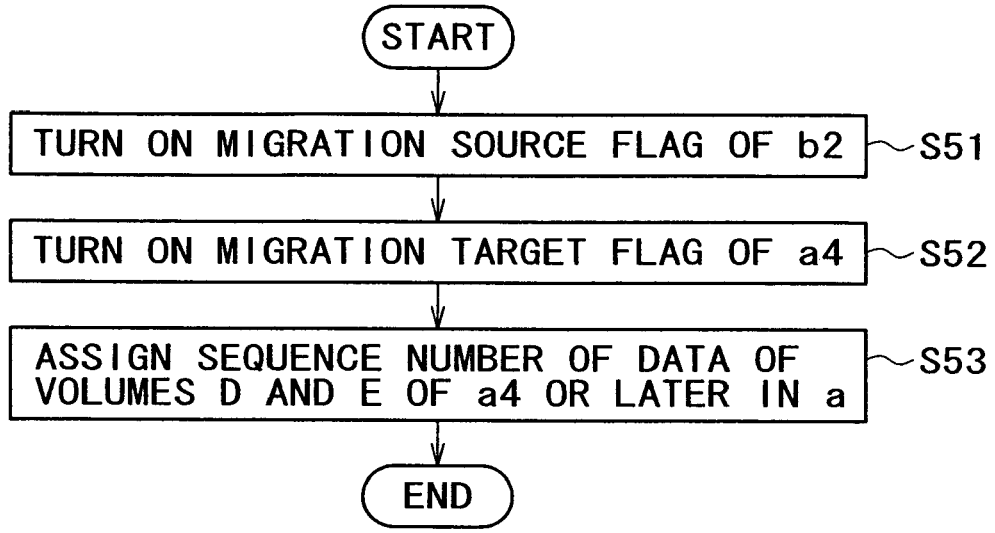
FIG. 18A is a flowchart showing the control flow on the primary storage system side.
Figure 18B:
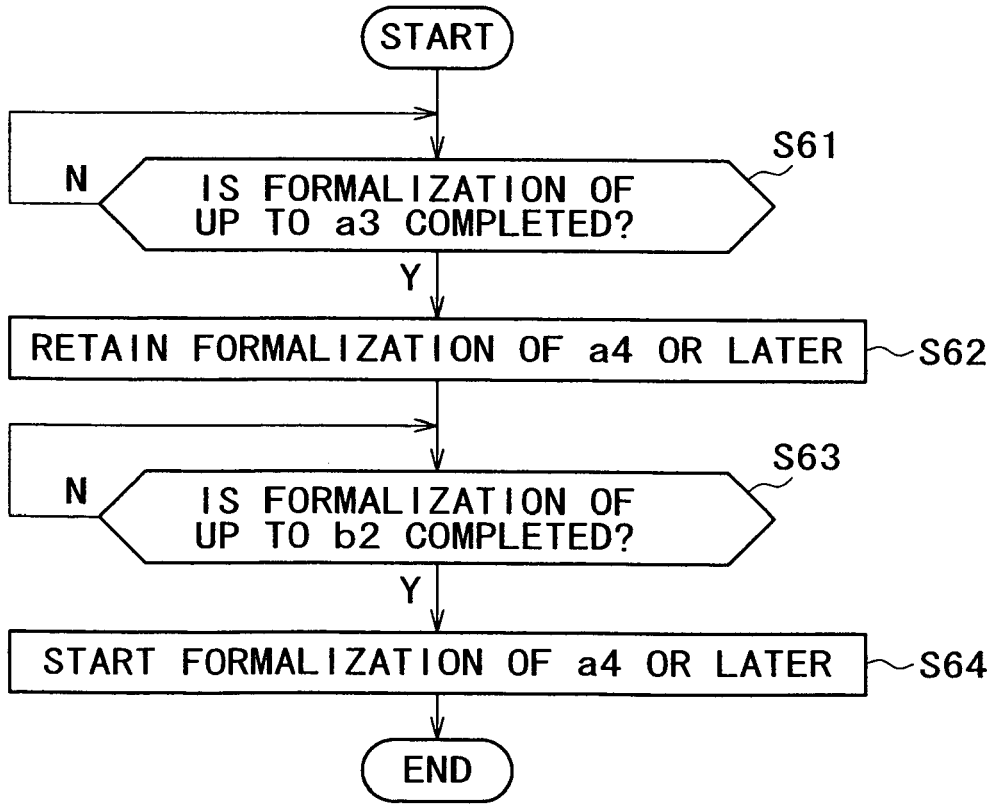
FIG. 18B is a flowchart showing the control flow on the secondary storage system side.
Figure 19:
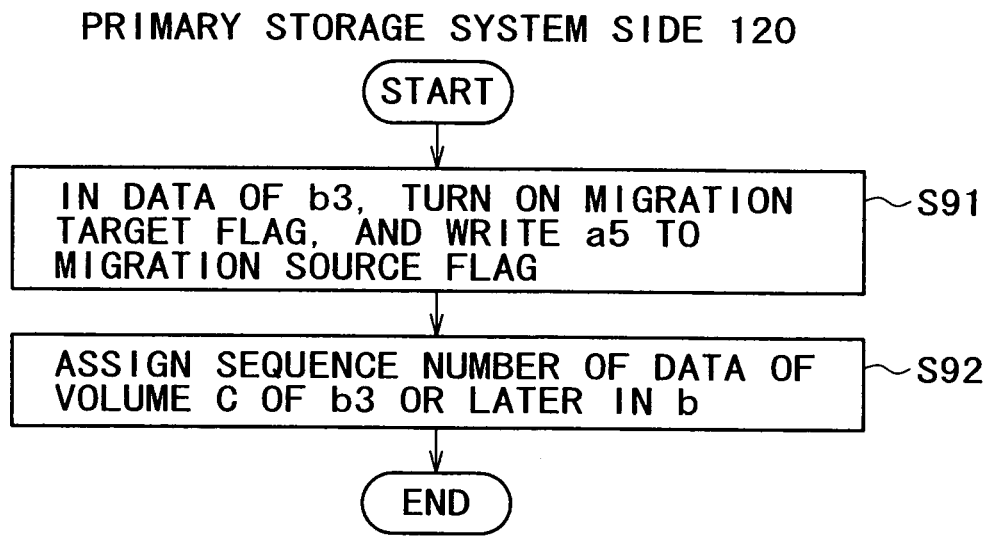
FIG. 19 is a flowchart showing the control flow on the primary storage system side.

Next, the control in the primary storage system 120 and the secondary storage system 220 when the RC data shown in FIGS. 17A and 17B is received is described referring to FIGS. 18A and 18B.

[Control Flow on the Side of the Primary Storage System 120]

FIG. 18A is a flowchart showing the control flow on the side of the primary storage system 120. The primary storage system 120 sends RC data to the side of the secondary site 200 sequentially. At this time, the primary storage system turns on the migration source flag 642 (S51) because the RC data of b2 is the RC data immediately before the consistency group integration point of time (timing "j") in the consistency group b that is the consistency group absorbed by integration.

Next, because the RC data of a4 is the first RC data after a consistency group is integrated, the migration target flag 643 is turned on (S52). Since a pair of the volumes D and E belongs to the consistency group a after this S52, the sequence number 310 of the RC data of the volumes D and E is assigned in a (S53).

That is, when each RC data item is sent from the side of the primary storage system 120, the specific data (b2 and a4 in this case) before and after the consistency group integration timing "j" is marked so that the RC data may be formalized correctly on the side of the receiving secondary storage system 220.

Further, a sequence number after a consistency group is integrated need not take over any of conventional sequence numbers or may be entirely a different number.

[Control on the Side of the Secondary Storage System 220]

Next, the control on the side of the secondary storage system 220 is described. The secondary storage system 220 receives RC data in the order (a2, a7, a1, a8, . . . ) of FIG. 17B from the side of the primary storage system 120. The side of the secondary storage system 220 stores the received RC data in the volume that corresponds to the secondary storage 221. In this case, with regard to the received data, when the RC data of the lower sequence number than the received RC data is all uniform in the consistency group. When the RC data of the lower sequence number 610 than the sequence number of the received RC data is not uniform, the received data is stored temporarily on a cache memory (not illustrated). These types of processing are the normal control in the secondary storage system 220, and such processing as shown in FIG. 18B is performed in addition.

FIG. 18B is a flowchart showing the control flow on the side of the secondary storage system 220. In the consistency group a that is the consistency group after integration, whether the formalization of a3 that is the RC data immediately before a4 that is the RC data to which the migration target flag 643 is assigned or not is completed is determined (S61). When the formalization of up to a3 is completed, the formalization of a4 or later of the consistency group a is retained in the next step (S62). When the formalization of up to b2 is completed in the consistency group b (S63), the formalization of a4 or later of the consistency group a is started (S64).

Accordingly, in the volume D', a4 is not reflected earlier than b1, and a consistency group can be integrated without any problem. That is, when the processing of FIG. 18A is not performed, a4 is reflected earlier than b1.

Further, an example in which two consistency groups are integrated is shown here. Even when three or more consistency groups are integrated, the migration source flag 642 is turned on in multiple RC data. Otherwise, the consistency group can be split and integrated in two or more stages. Furthermore, even when a volume that does not belong to any consistency group is integrated, the integration from the three consistency groups can be realized in the same manner.

<Migration Example 2 of a Consistency Group>

Subsequently, an migration example 2 of a consistency group is described referring to FIGS. 13A and 13B, FIGS. 14A and 14B, and FIG. 19. Example 2 has the composition and processing almost common to the above <Migration example of a consistency group>, and only a difference is described.

First, the RC data to be sent and received is shown in FIGS. 13A and 13B in the same manner as the <Migration example of a consistency group>. Moreover, the processing on the side of the secondary storage system 220 is the same as FIG. 14B. This migration example differs from the above <Migration example of a consistency group> only in that the primary storage system 120 inputs a5 to the migration source flag 642 of the RC data of b3 like S91 of FIG. 19 instead of turning on the migration source flag 642 of the RC data of a5 like S11 of FIG. 14.

Accordingly, the migration information 640 may only be assigned to one RC data item (b3), and application becomes easier than the above <Migration example of a consistency group>. Consequently, in the volume C', b4 is not reflected earlier than a4, and the consistency group of the pair of the volume C can be migrated.

Further, at this point, a sequence number of RC data immediately before migration timing is input to an item of the migration source flag 642 of the migration information 640 of FIG. 6. However, instead of changing a part of the migration information 640 in this manner, the item to which the sequence number of the relevant RC data is input may be added newly to the RC data. Moreover, the RC data is retained as shown in FIG. 6, the information is stored in the control memory 135 of the primary storage system 120 or a control memory (not illustrated) of the secondary storage system 220, and processing may also be performed. Furthermore, this method can be implemented in the same manner even in the split and integration of the consistency group.

<Migration Example of a Consistency Group Using Differential Copying>

Subsequently, a migration example of a consistency group using differential copying is described referring to FIG. 20 and FIG. 21.

Figure 20:
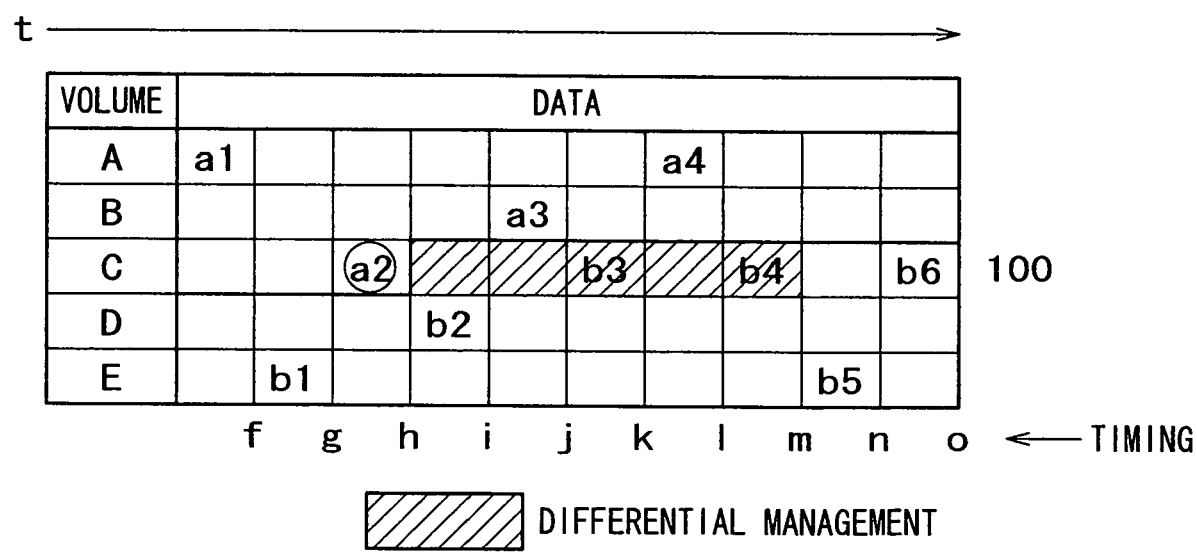
FIG. 20 is, in the migration example of the consistency group using differential copying, a drawing showing the order of the write request for the data to the primary storage system by the primary host using the sequence number in the time series.

FIG. 20 shows the RC data in which a write request is issued by the primary host 110 using the sequence number 610 in a time series, in the same manner as FIG. 13A. Further, the receiving order of the RC data on the side of the secondary storage system 220 is not illustrated or described. In this case, at timing "h", the pair of the volume C migrates from the consistency group a to the consistency group b. Moreover, the normal processing of the primary storage system 120 and the secondary storage system 220 is the same as a conventional example, and can be omitted partly.

The control in the primary storage system 120 and the secondary storage system 220 when a write request is issued from the primary host 110 as shown in FIG. 20 is described, referring to FIG. 21.

[Control on the Side of the Primary Storage System 120]

Figure 21A:
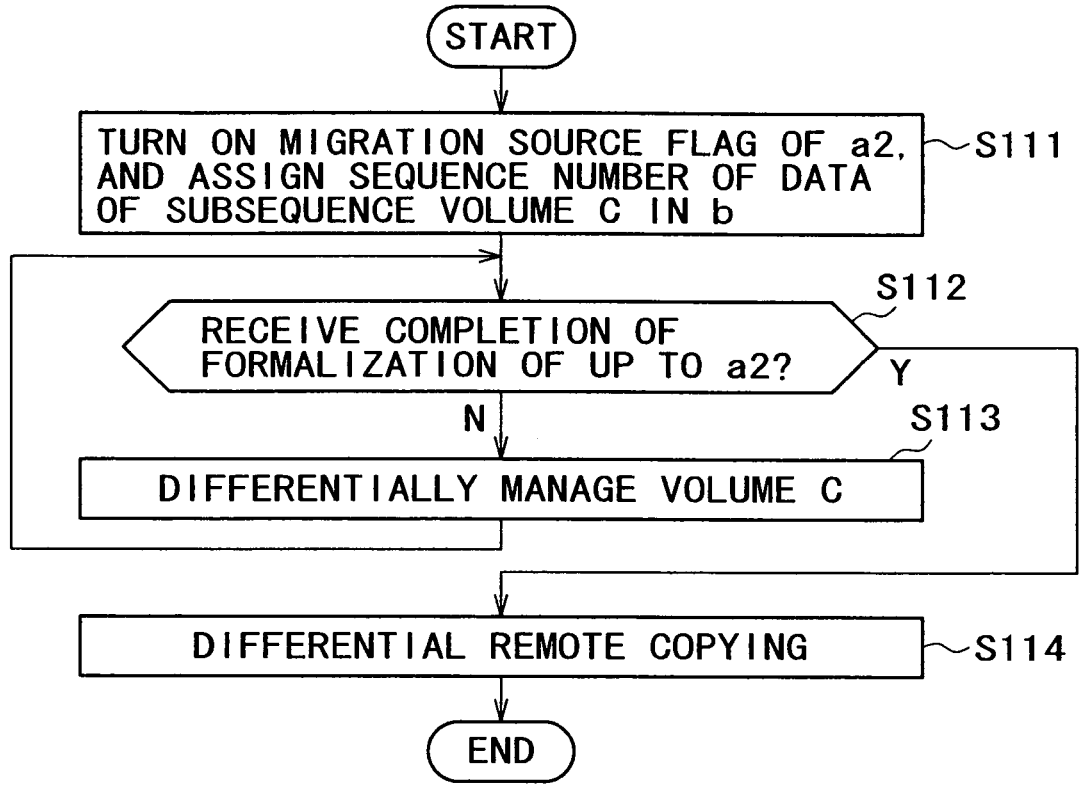
FIG. 21A is a flowchart showing the control flow on the primary storage system side.

The primary storage system 120 executes such processing as the flowchart of FIG. 21A in addition to normal RC data sending.

FIG. 21A is a flowchart showing the control flow on the side of the primary storage system 120. The primary storage system turns on the migration source flag 642 of a5 that is the RC data immediately before migration timing "h" in the consistency group a before migration, and assigns the sequence number 610 of the RC data of the subsequent volume C in b (S111). Subsequently, by the time that notification indicating that the formalization of up to a2 is completed is received from the secondary storage system 220 (S112), the data update into the volume C is managed differentially (S113). The notification indicating that the formalization of up to the a2 is completed is received from the secondary storage system at timing "m" (S112), the differential remote copying of the volume C is performed (S114).

[Control on the Side of the Secondary Storage System 220]

Next, the control on the side of the secondary storage system 220 is described. The secondary storage system 220 receives the RC data received from the side of the primary storage system 120. The side of the secondary storage system 220 stores the received the RC data in the volume that corresponds to the secondary storage 221 with regard to the received data when the RC data of the lower sequence number than the received RC data is all uniform in the consistency group. When the RC data of the lower sequence number than the sequence number of the received RC data is not uniform, the received data is stored temporarily on a cache memory (not illustrated). These types of processing are the normal control in the secondary storage system 220, and such processing as shown in FIG. 18B is performed in addition.

Figure 21B:
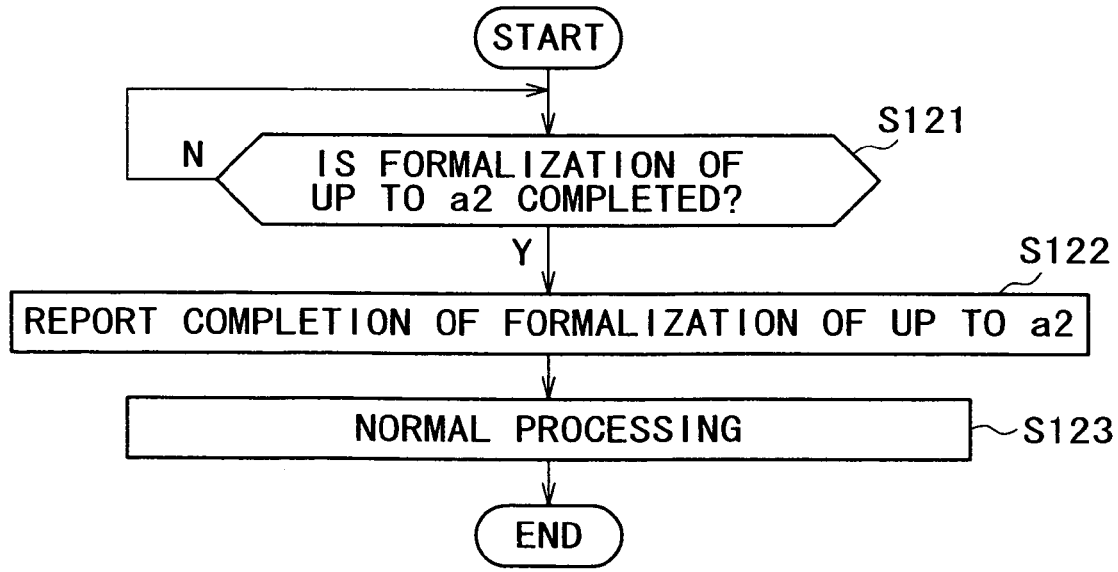
FIG. 21B is a flowchart showing the control flow on the secondary storage system side.

FIG. 21B is a flowchart showing the control flow on the side of the secondary storage system 220. First, in the consistency group a, whether the formalization of up to a2 is completed is determined (S121). And, when the formalization of up to a2 is completed, the completion is reported to the primary storage system 120 (S122). Subsequently, processing returns to normal processing (S123), and the RC data sent from the primary storage system 120 is received, processed, and formalized.

Accordingly, in the volume C', b3 and b4 are not reflected earlier than a2, and a consistency group of the pair of the volume C can be migrated without any problem. Moreover, an amount of data to be sent can be reduced by performing differential management and differential remote copying.

The migration of a consistency group is described here. However, even in the case of the split and integration of the consistency group, the same operational advantages can be obtained in the same manner using differential management and differential remote copying.

As described above, a remote copying system according to an embodiment of the present invention can migrate a pair volume of remote copying into another consistency group by assigning a flag that indicates migration timing to remote copying data, or reporting a sequence number of the migration timing. This is effective, for example, when a transaction of a user who utilizes the remote copying system and the composition of a consistency group is changed. Moreover, this is also effective when the job that is operated in a large consistency group is subdivided, or, conversely, multiple consistency groups are uniformed into one.

The description of embodiments is terminated with this, but the embodiment of the present invention is not limited to these embodiments. For example, in order to report the RC data immediately before and after a consistency group is changed from a primary storage system to a secondary storage system, a migration source flag or a migration target flag may also be reported independently of the RC data instead of being included in remote copying data.

Moreover, when the consistency group is migrated, split, and integrated, it is assumed that several volumes do not belong to any consistency group before or after the operation. In that case, however, this problem can be resolved by a simple operation such as assigning a formal ID to a consistency group ID of the remote copying data. In addition, specific composition can be changed properly within the range not deviating from the purpose of the present invention.

What is claimed is:

1. A remote copying method in a remote copying system, the remote copying system comprising:

a first site that includes a plurality of first site logical storage areas, the first site sending data for which write requests are issued to the first site logical storage area, and a second site that includes a plurality of second site logical storage areas and that receives the data, the remote copying method including the steps of:

for consistency between order of the write requests and reflection order of the data in the second site on the second site logical storage area, providing a plurality of consistency groups, each comprised of a group of the first site logical storage areas in the first site, that send and receive the data using respective independent sequence numbers regarding an order of the write requests of pairs of the first site logical storage area and the second site logical storage area, and the second site reflects the data that is received regarding the group of first site logical storage areas in each of the consistency groups of which the sequence numbers are uniform, on the second site logical storage area, and performing a composition change of the group of the first site logical storage areas comprising a selected at least one of the consistency groups, wherein the second site starts a reflection operation of the data belonging to the at least one selected consistency group on the second site logical storage area, which data is sent in response to one of the write requests by the first site after the composition change, after reflection of specific data sent in response to one of the write requests by the first site on the second site logical storage area before the composition change, wherein the composition change is migration from a first consistency group to a second consistency group of a specific pair among the pairs, the selected consistency group is the second consistency group, and the specific data is the final data sent in response to the write request by the first site immediately before the composition change in the first consistency group, wherein the first site turns on a migration source flag for the final data in the first consistency group sent in response to the write request by the first site immediately before the migration of the specific pair from the first consistency group to the second consistency group, wherein the first site turns on a migration target flag for the first data for the second consistency group sent in response to one of the write requests immediately after the migration of the specific pair from the first consistency group to the second consistency group, wherein, after turning on the migration source flag and the migration target flag, the first site assigns a sequence number of data for the specific pair for the second consistency group to be the same sequence number or a higher sequence number than the sequence number of the first data for the second consistency group immediately after the migration of the specific pair, wherein the second site checks to see if formalization of all data in the second consistency group, prior to the data for which the migration target flag has been turned on, is complete, and when it is determined that formalization is complete for all data prior to the data for which the migration target flag has been turned on, the second site starts formalization of the first data for which the migration target flag has been turned ON.

2. A remote copying method in a remote copying system, the remote copying system comprising:

a first site that includes a plurality of first site logical storage areas, the first site sending data for which write requests are issued to the first site logical storage area and a second site that includes a plurality of second site logical storage areas and receives the data, the remote copying method including the steps of:

for consistency between order of the write requests and reflection order of the data in the second site on the second site logical storage area, providing a plurality of consistency groups each comprised of a group of the first site logical storage areas in the first site, that send and receive the data using respective independent sequence numbers regarding an order of the write requests of pairs of the first site logical storage area and the second site logical storage area, and the second site reflects the data that is received regarding the group of first site logical storage areas in each of the consistency groups of which the sequence numbers are uniform, on the second site logical storage area, and changing the group of the first site logical storage areas comprising at least one of the consistency groups to which a specific pair belongs, wherein the first site, when one of the write requests concerning specific data is issued after the change, assigns the sequence number of at least one selected consistency group after the change to the data for which the write request is issued, retains the data, and starts sending the retained data, after notification indicating that the reflection of the data sent for which the write request is issued in the first site not later than a timing of the change in the at least one selected consistency group before the change of the specific pair, on the second site logical storage area is terminated is received from the second site, wherein the composition change is migration from a first consistency group to a second consistency group of a specific pair among the pairs, the selected consistency group is the second consistency group, and the specific data is the final data sent in response to the write reguest by the first site immediately before the composition change in the first consistency group, wherein the first site turns on a migration source flag for the final data in the first consistency group sent in response to the write request by the first site immediately before the migration of the specific pair from the first consistency group to the second consistency group, wherein the first site turns on a migration target flag for the first data for the second consistency group sent in response to one of the write requests immediately after the migration of the specific pair from the first consistency group to the second consistency group, wherein, after turning on the migration source flag and the migration target flag, the first site assigns a sequence number of data for the specific pair for the second consistency group to be the same sequence number or a higher sequence number than the sequence number of the first data for the second consistency group immediately after the migration of the specific pair, wherein the second site checks to see if formalization of all data in the second consistency group, prior to the data for which the migration target flag has been turned on, is complete, and when it is determined that formalization is complete for all data prior to the data for which the migration target flag has been turned on, the second site starts formalization of the first data for which the migration target flag has been turned ON.

3. The remote copying method according to claim 2, wherein the first site, while the data sending is retained after the change, updates the data according to the write request in a unit of a differential management area in which the first site logical storage area of the specific pair is split into a plurality of areas, and sends the data of the area among the differential management areas in which the update is performed after the data sending is started.

4. A remote copying method that transfers data from a first storage system including a storage in which a plurality of first logical storage areas may be formed to a second storage system that establishes a pair relationship with the first storage system and includes a storage in which a plurality of second logical storage areas may be formed to thereby provide pairs which are each comprised of one of the first logical storage areas and one of the second logical storage areas, comprising:

writing data to one of the first logical storage areas for which write requests for data are issued from a host in the first storage system;

transferring the data corresponding to the write request from the first storage system to the second storage system;

changing a consistency group among a plurality of consistency groups, each comprised of a group of the first logical storage areas in order to change the logical storage areas, included in the consistency groups, in the first storage system, the change comprising migration of a specific one of the pairs from a first consistency group to a second consistency group;

writing the data transferred from the first storage system to the second logical storage area in which the pair relationship is established, in the first storage system;

writing received data to the second logical storage area belonging to the first consistency group before the change, among the received data, in the second storage system;

determining whether the data has been written to the second logical storage area belonging to the first consistency group before the change, in the second storage system; and writing the received data to the second logical storage area belonging to the second consistency group after the change when the data has been written to the second logical storage area belonging to the first consistency group before the change, as a result of the determination, wherein the first storage system turns on a migration source flag for the final data in the first consistency group sent in response to the write reguest by the first storage system immediately before the migration of the specific pair from the first consistency group to the second consistency group, wherein the first storage system turns on a migration target flag for the first data for the second consistency group sent in response to one of the write requests immediately after the migration of the specific pair from the first consistency group to the second consistency group, wherein, after turning on the migration source flag and the migration target flag, the first storage system assigns a sequence number of data for the specific pair for the second consistency group to be the same sequence number or a higher sequence number than the sequence number of the first data for the second consistency group immediately after the migration of the specific pair, wherein the second site checks to see if formalization of all data in the second consistency group, prior to the data for which the migration target flag has been turned on, is complete, and when it is determined that formalization is complete for all data prior to the data for which the migration target flag has been turned on, the second storage system starts formalization of the first data for which the migration target flag has been turned ON.

5. The remote copying method according to claim 4, further comprising:

in the first storage system a step of assigning a number of independent sequentiality to every consistency group for data written to the first logical storage area, wherein a step of transferring data from the first storage system to the second storage system transfers the data that corresponding to the write requests to the first logical storage area, and the number of independent sequentiality, and in the second storage system a step of determining whether all numbers of independent sequentiality earlier than the received number of independent sequentiality are uniform, in at least one of the consistency groups, wherein, when all the numbers of independent sequentiality are uniform as a result of the determination, wherein the received data that corresponds to the uniform numbers of independent sequentiality is written to the logical storage area which belongs to the one consistency group and establishes a selected relationship.

6. The remote copying method according to claim 4, wherein, as a result of the determination as to whether data was written to the second logical storage area belonging to the first consistency group before the change, when the data has not been written, the received data to the second logical storage area belonging to the second consistency group after the change is retained from being written.

7. The remote copying method according to claim 4, wherein the data transferred from the first storage system to the second storage system includes IDs that identify specific ones of said consistency groups, an assigned sequence number of sequentiality, copying data information including an ID that indicates the logical storage area of each of a plurality of copying data information items, a data storage address, data length, and data, and migration information including a migration ID, the migration source flag and the migration target flag.

8. The remote copying method according to claim 7, wherein the first storage system turns on the migration source flag to final data earlier than a consistency group migration period of time in the first consistency group before the change, and transfers the data to the second storage system, and the second storage system checks the flag, and writes the data to the second logical storage area when all the data of the sequence numbers before the sequence number of the data in which the flag turns on is uniform.

9. The remote copying method according to claim 4, wherein the change of the consistency group is performed by inputting, from a terminal device, a migration command that includes an ID indicating the first consistency group as a migration source consistency group, an ID indicating the second consistency group as a migration target consistency group, and pair information indicating the first logical storage area and the second logical storage area that are to be migrated and in which a pair relationship is established.

10. A remote copying system that transfers and stores data between a first storage system and a second storage system through a network, comprising:

the first storage system including:

a first storage for storing data in which a plurality of first logical storage areas are formed, and a first storage controller that performs input and output processing to the first logical storage area of the first storage in accordance with requests from a host, and controls transfer of the data to the second storage system, and the second storage system including:

a second storage for storing data in which a plurality of second logical storage areas are formed, and a second storage controller that performs input and output processing to the second logical storage, and controls transfer of the data between itself and the first storage system, wherein a plurality of pairs are provided, each comprised of one of the first logical storage areas and one of the second logical storage areas, the first storage controller performs control of changing at least one consistency group among a plurality of consistency groups, each comprised of a group of the first logical storage areas, in order to change the first logical storage areas included in the group, in the first storage system, the change comprising migration of a specific one of the pairs from a first consistency group to a second consistency group the second storage controller receives data so as to be written to the second logical storage area belonging to the first consistency group before the change, among the received data, and when whether the data has been written to the second logical storage area belonging to the first consistency group before the change is determined, and, as a result of the determination, if the data has been written to the second logical storage area belonging to the first consistency group before the change, the received data is controlled so as to be written to the second logical storage area belonging to the second consistency group after the change, wherein the first storage controller turns on a migration source flag for the final data in the first consistency group sent in response to the write reguest by the first site immediately before the migration of the specific pair from the first consistency group to the second consistency group, wherein the first storage controller turns on a migration target flag for the first data for the second consistency group sent in response to one of the write requests immediately after the migration of the specific pair from the first consistency group to the second consistency group, wherein, after turning on the migration source flag and the migration target flag, the first storage controller assigns a sequence number of data for the specific pair for the second consistency group to be the same sequence number or a higher sequence number than the sequence number of the first data for the second consistency group immediately after the migration of the specific pair, wherein the second site checks to see if formalization of all data in the second consistency group, prior to the data for which the migration target flag has been turned on, is complete, and when it is determined that formalization is complete for all data prior to the data for which the migration target flag has been turned on, the second storage controller starts formalization of the first data for which the migration target flag has been turned ON.

11. The remote copying system according to claim 10, further comprising:

the first storage controller including:

means for assigning a number of independent sequentiality per consistency group to the data written to the first logical storage area, and means for transferring the data corresponding to the write requests to the first logical storage area, and information including the number of independent sequentiality, to the second storage system, and further comprising:

the second storage controller including:

means for determining whether all numbers of independent sequentiality before the received number are uniform, in one consistency group, and means for performing control for writing the received data that corresponds to the uniform number to the logical storage area that belongs to the one consistency group and establishes a selected relationship when all the numbers of independent sequentiality are uniform as a result of the determination.

12. The remote copying system according to claim 11, wherein the first storage controller and the second storage controller include a memory respectively, and store, in the memory, consistency group management information including an ID that identifies a consistency group, information that indicates a state of the logical storage area in which a pair relationship is established, the most newly assigned number of independent sequentiality among the numbers assigned to data that is transferred to the second storage system in the consistency group, the oldest number among numbers assigned to the data that is not transferred to the second storage system, the number concerning the written data when the data whose numbers are uniform sequentially has been written to the second storage, and management information concerning the logical storage area that is included in the consistency group and in which the pair relationship is established.

13. The remote copying system according to claim 11, wherein the data transferred from the first storage system to the second storage system includes IDs that identify consistency groups, an assigned sequence number of sequentiality, copying data information including an ID that indicates the logical storage area of each of a plurality of copying data information items, a data storage address, data length, and data, and migration information including a migration ID, the migration source flag and the migration target flag, the first storage system turns on the migration source flag to data earlier than a consistency group migration period of time in the first consistency group before the change, and transfers the data to the second storage system, and the second storage system checks the flag, and controls the data so as to be written to the second logical storage area when all the data of the sequence numbers before the sequence number of the data in which the flag turns on is uniform.

14. The remote copying system according to claim 10, wherein the first storage controller and the second storage controller include a memory respectively, and stores, in the memory, pair volume management information that includes a pair ID that identifies a pair relationship, information on the first logical storage area that is a duplicate source of remote copying data in the first storage, information on the second logical storage area that is the duplicate copy of remote copying data in the second storage, and pair information indicating a state of the pair relationship at least including a bitmap that indicates whether the data has been rewritten per predetermined unit of the first logical storage area in the first storage and the first storage controller transfers and controls only the data that corresponds to a bit which indicates that data is rewritten by referring to the bitmap inside the pair volume management information.

15. A remote copying system that transfers and stores data between a first storage system and a second storage through a network, comprising:

the first storage system including:

a first storage for storing data in which a plurality of first logical storage areas are formed, and a first storage controller that performs input and output processing to the first logical storage area of the first storage in accordance with write requests from a host, and controls transfer of the data to the second storage system, and the second storage system including:

a second storage for storing data, in which a plurality of second logical storage areas are formed, and a second storage controller that performs the input and output processing to the second storage, and controls transfer of the data between itself and the first storage system, wherein the first storage controller includes:

means for changing at least one consistency group comprised of a group of the first logical storage areas in order to change the first logical storage areas included in the group, in the first storage system;

means for assigning a number of independent sequentiality per consistency group to the data written to the first logical storage area, and means for transferring the data corresponding to the write requests to the first logical storage area, and information including the number of independent sequentiality to the second storage system, and the second storage controller including:

means for controlling received data so as to be written to the second logical storage area belonging to the consistency group before change, among the received data;

means for determining whether all numbers of independent sequentiality before the received number are uniform, in one consistency group; and means for controlling the received data so as to be written, which corresponds to the uniform number, to the logical storage area that belongs to the one consistency group and establishes a predetermined relationship when all the numbers of independent sequentiality are uniform as a result of the determination, the first storage controller and the second storage controller include a memory respectively, and store, in the memory, a first table that reflects consistency group management information including IDs that identify specific of ones of said consistency groups, information that indicates a state of the logical storage area in which a pair relationship is established, the most newly assigned number among the numbers assigned to data that is transferred to the second storage system in the consistency group, the oldest number among the numbers assigned to the data that is not transferred to the second storage system, the number of independent sequentiality concerning written data if the data whose number is uniform has been sequentially written to the second storage, and management information concerning the logical storage area in which the pair relationship is established and that is included in the consistency group, as well as a second table that reflects pair volume management information including the pair ID that identifies the pair relationship, information on the first logical storage area that is a duplicate source of remote copying data in the first storage, information on the second logical storage area that is the duplicate copy of remote copying data in the second storage, and pair information indicating a state of the pair relationship at least including a bitmap that indicates whether the data has been rewritten per selected unit of the first logical storage area in the first storage, the data transferred from the first storage system to the second storage system includes the IDs that identify specific ones of the consistency groups, the assigned sequence number of sequentiality, copying data information including the ID that indicates the logical storage area of each of a plurality of remote copying data information items, a data storage address, data length, and data, and migration information including a migration ID, a migration source flag and a migration target flag, the first storage controller turns on the migration source flag to data earlier than a consistency group migration period of time in the consistency group before the change, and transfers the data to the second storage system, and the second storage system checks the flag, and performs the control of writing the data to the second logical storage area when all the data of the sequence numbers before the sequence number of the data in which the flag turns on is uniform.

* * * * *